Aug. 26, 1941.  H. T. AVERY  2,253,748
CALCULATING MACHINE
Filed Sept. 23, 1935     19 Sheets-Sheet 1

INVENTOR.
Harold T. Avery
BY Chas. E. Townsend
ATTORNEY

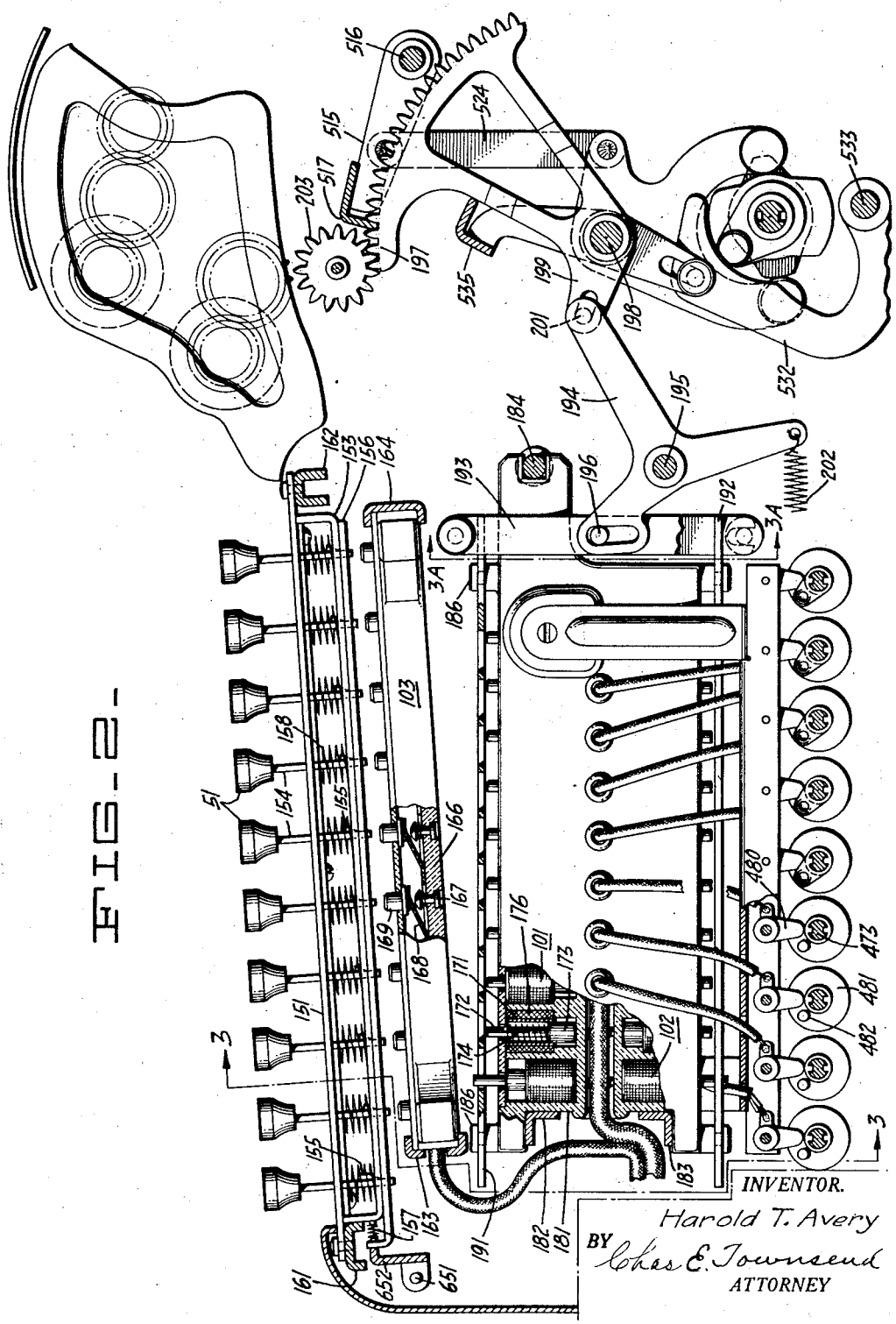

FIG_3_
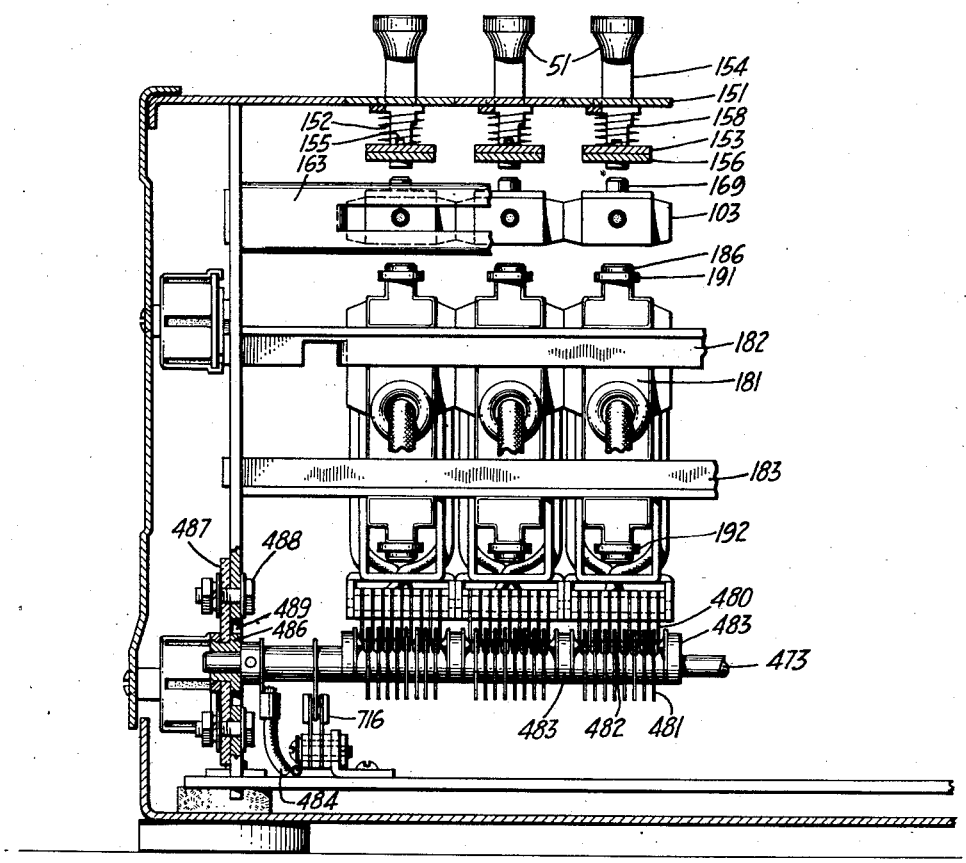
FIG_3A_
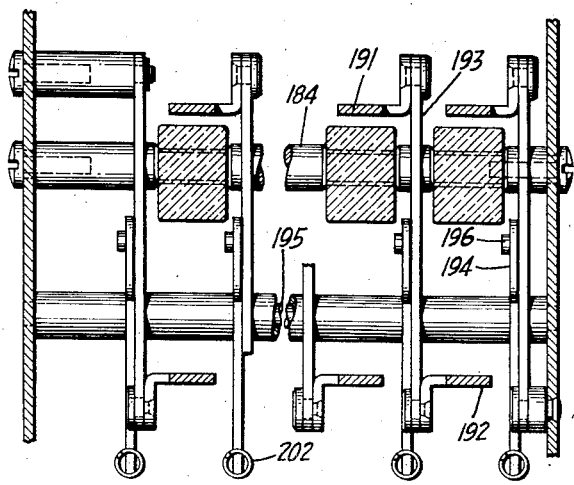
INVENTOR.
Harold T. Avery
BY Chas E Townsend
ATTORNEY

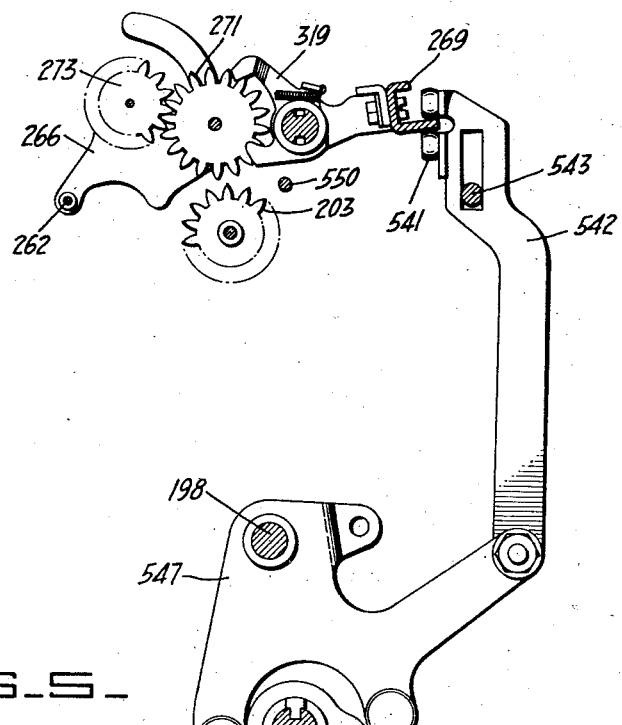
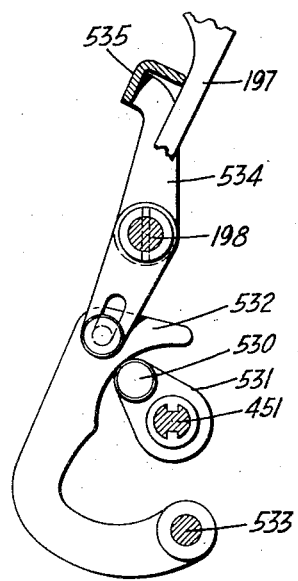
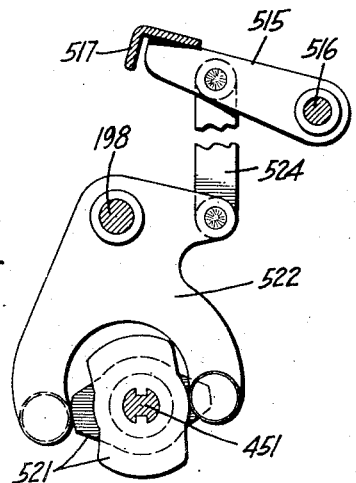

Aug. 26, 1941. H. T. AVERY 2,253,748
CALCULATING MACHINE
Filed Sept. 23, 1935 19 Sheets-Sheet 5
FIG-7-
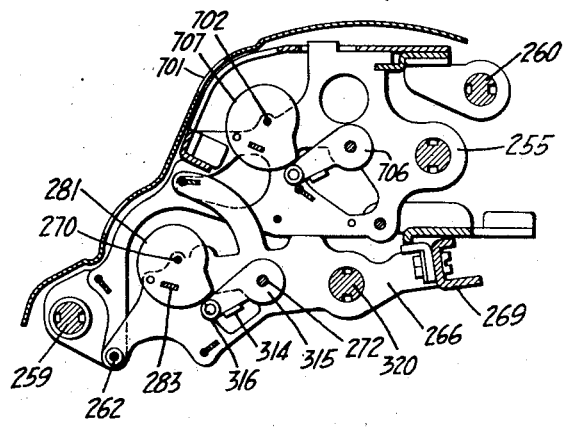
FIG-8-
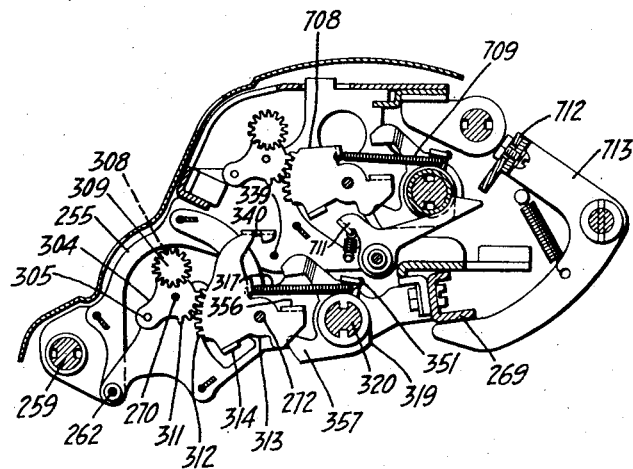
INVENTOR.
Harold T. Avery
BY Chas. E. Townsend
ATTORNEY Aug. 26, 1941. H. T. AVERY 2,253,748
CALCULATING MACHINE
Filed Sept. 23, 1935 19 Sheets-Sheet 6
FIG_9_
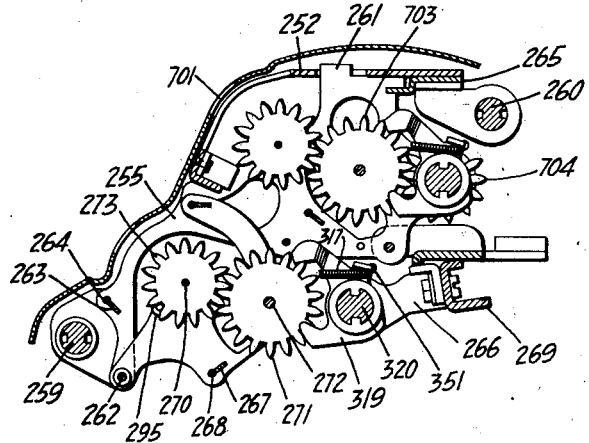
FIG_10_
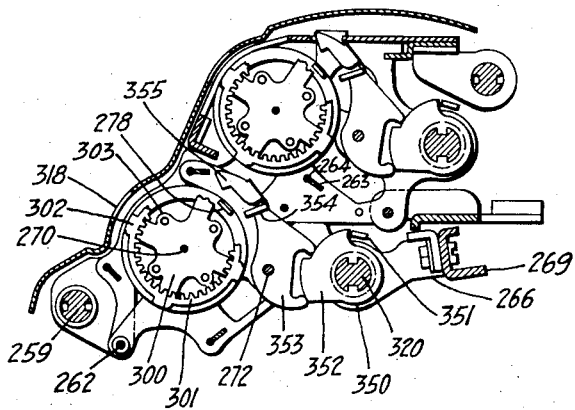
INVENTOR.
Harold T. Avery
BY Chas E Townsend
ATTORNEY

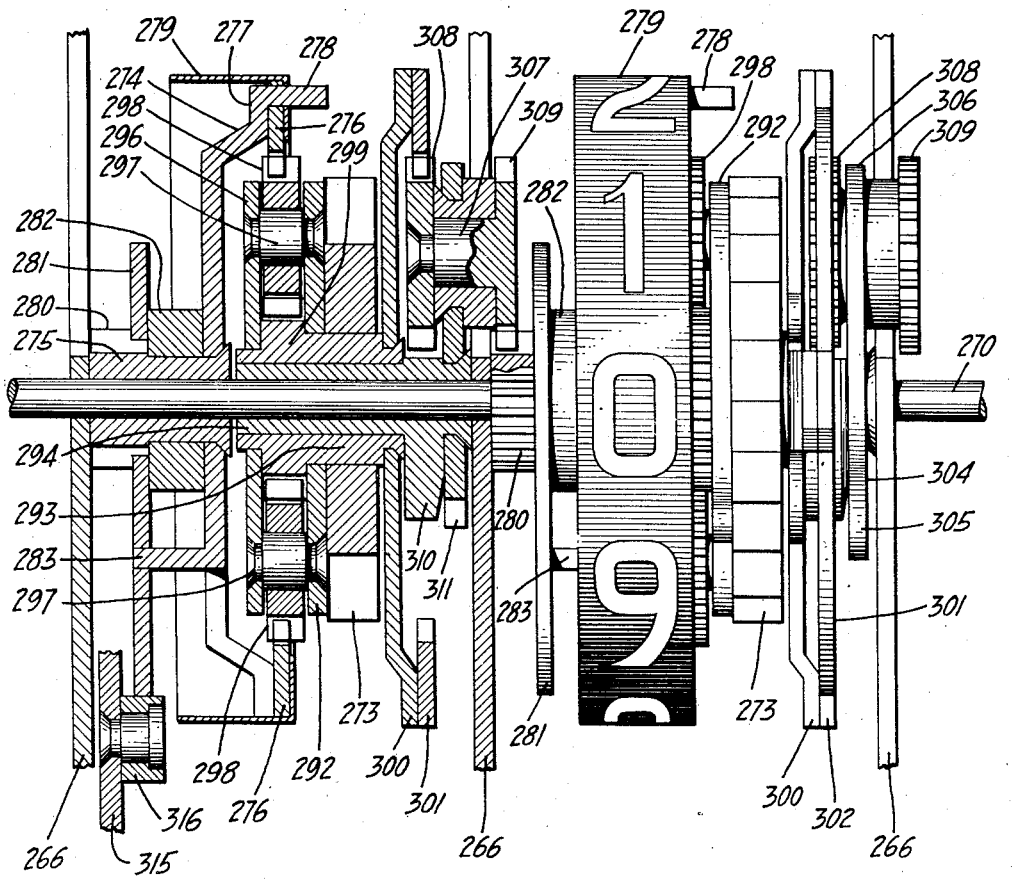
FIG_11_

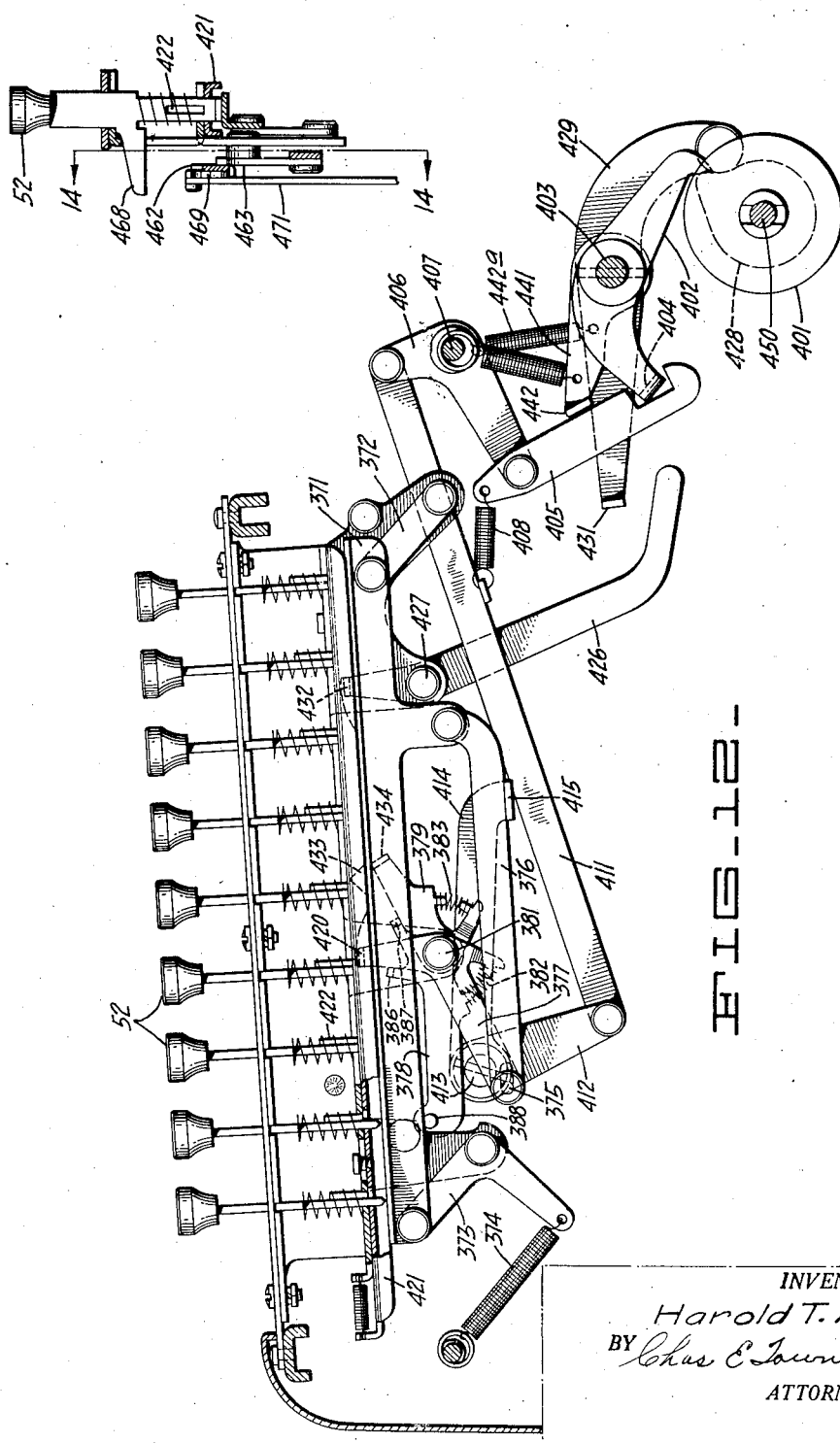

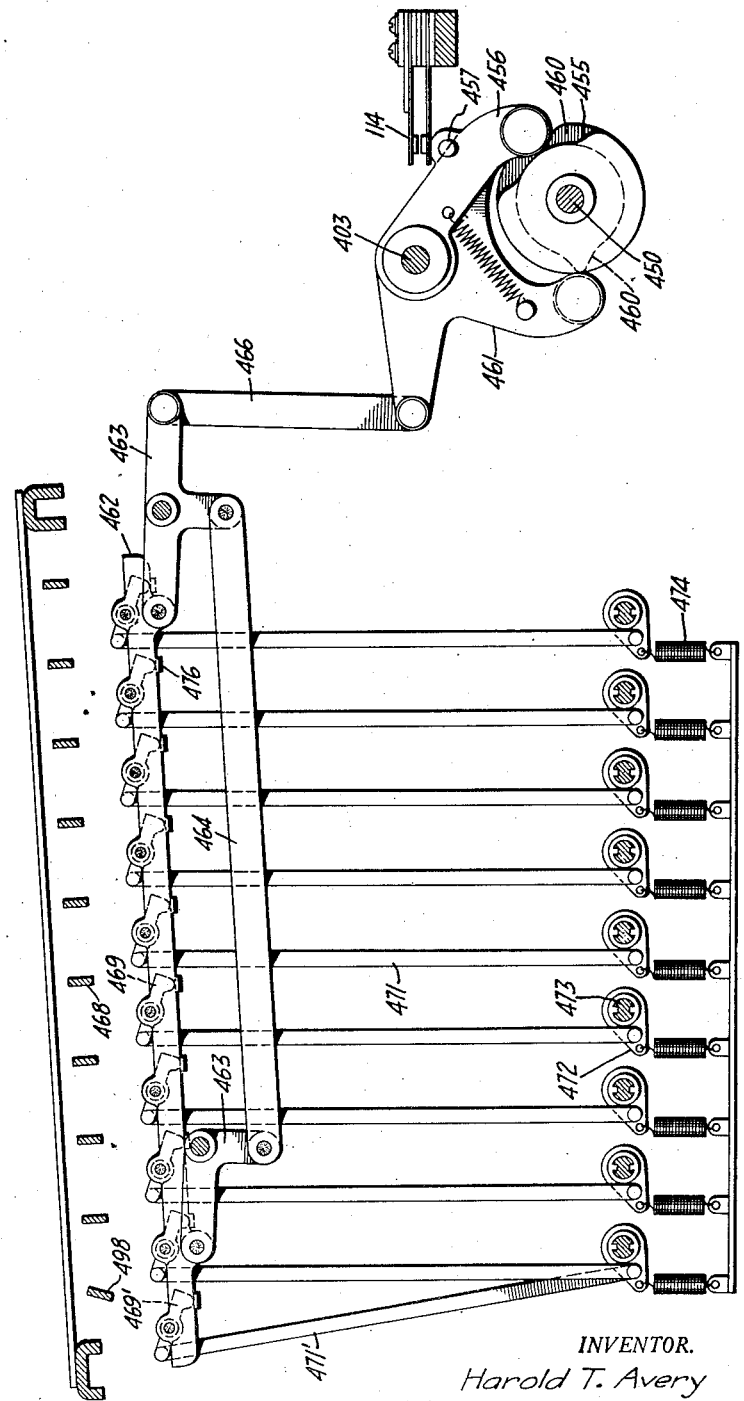

Aug. 26, 1941.  H. T. AVERY  2,253,748
CALCULATING MACHINE
Filed Sept. 23, 1935   19 Sheets-Sheet 10
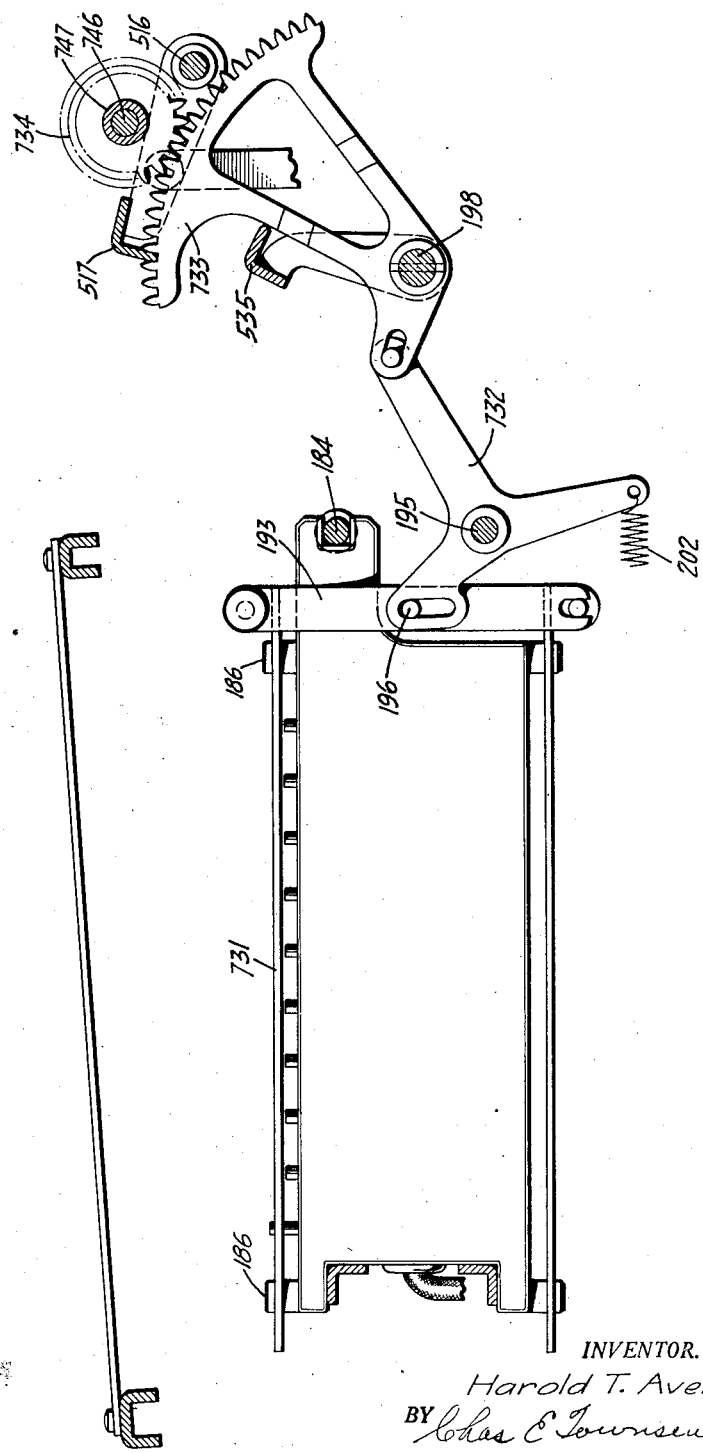
INVENTOR.
Harold T. Avery
BY Chas E Townsend
ATTORNEY Aug. 26, 1941.  H. T. AVERY  2,253,748
CALCULATING MACHINE
Filed Sept. 23, 1935  19 Sheets-Sheet 11

INVENTOR.
Harold T. Avery
BY Chas E Townsend
ATTORNEY

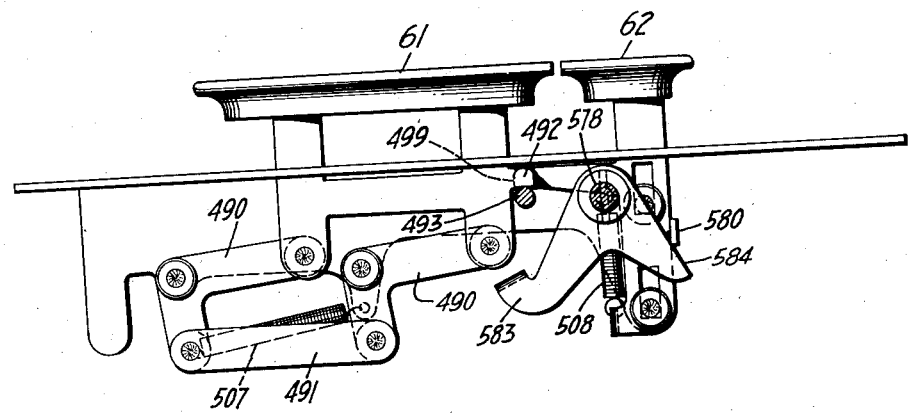
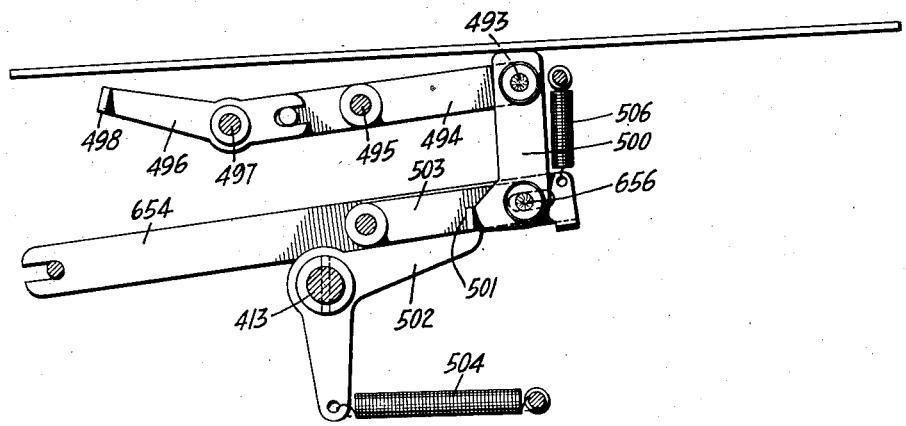
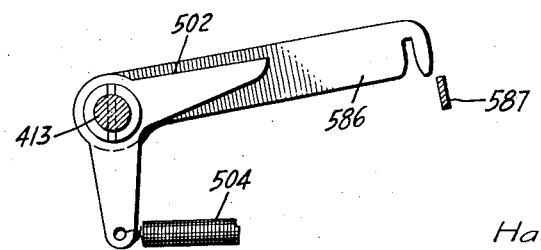

Aug. 26, 1941.   H. T. AVERY   2,253,748
CALCULATING MACHINE
Filed Sept. 23, 1935   19 Sheets-Sheet 13
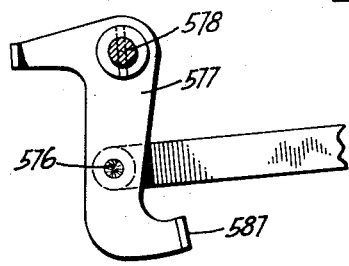
FIG_21_
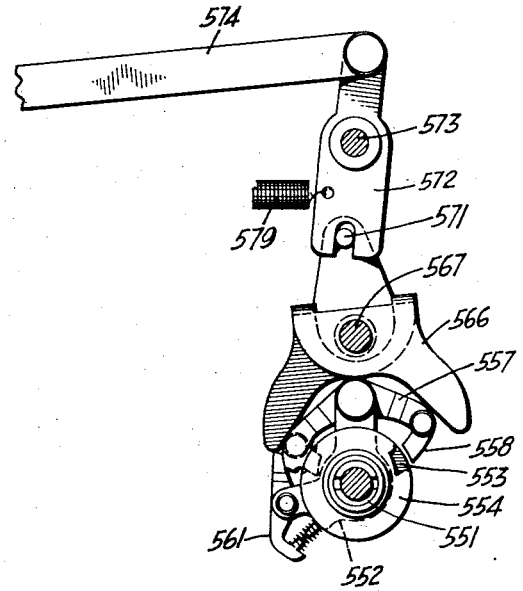
FIG_22_
FIG_23_
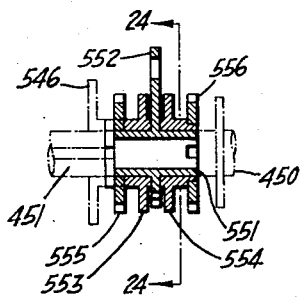
FIG_24_
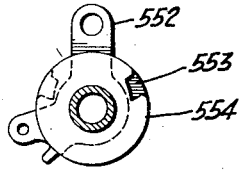
FIG_25_
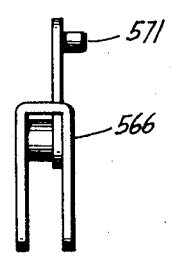
INVENTOR.
Harold T. Avery
BY Chas E Townsend
ATTORNEY Aug. 26, 1941. H. T. AVERY 2,253,748
CALCULATING MACHINE
Filed Sept. 23, 1935 19 Sheets-Sheet 14
FIG_26_
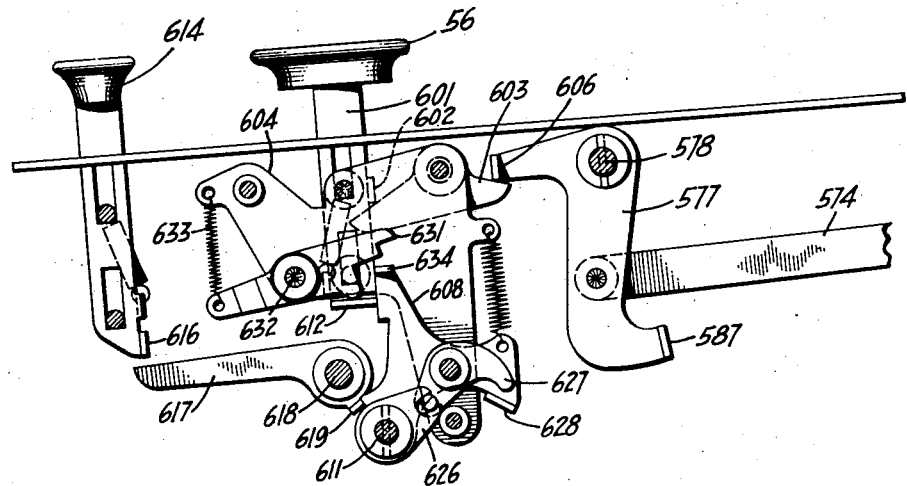
FIG_27_
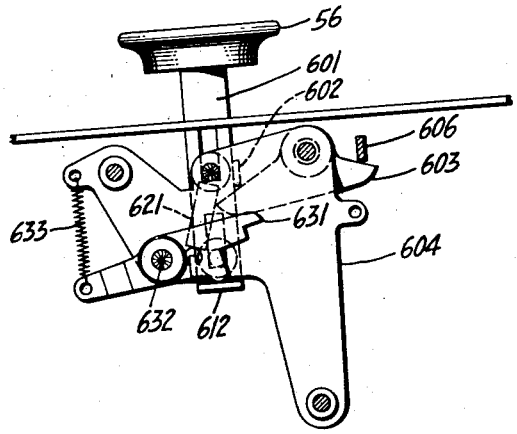
FIG_28_
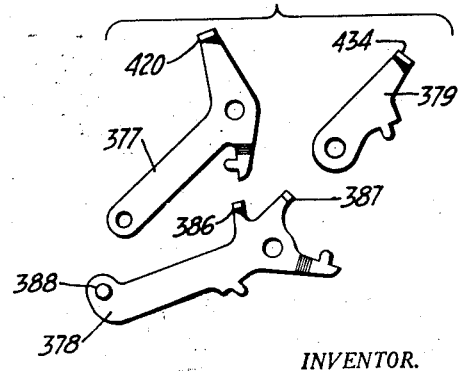
INVENTOR.
Harold T. Avery
BY Chas E Townsend
ATTORNEY

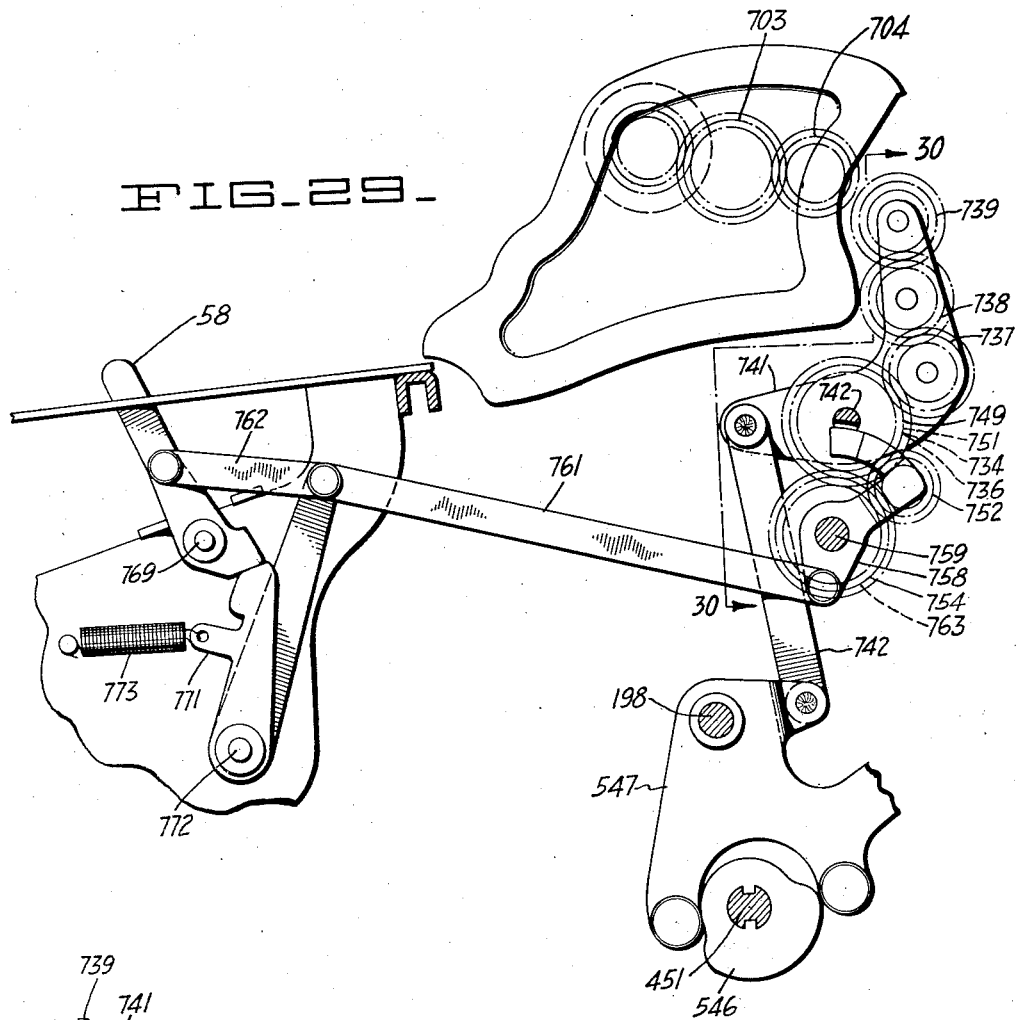
FIG_29_
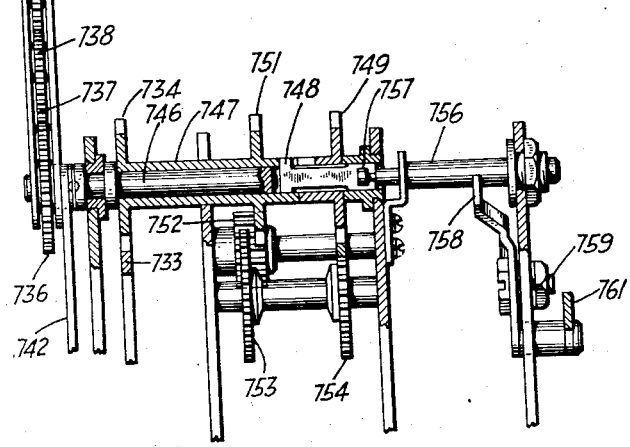
FIG_30_

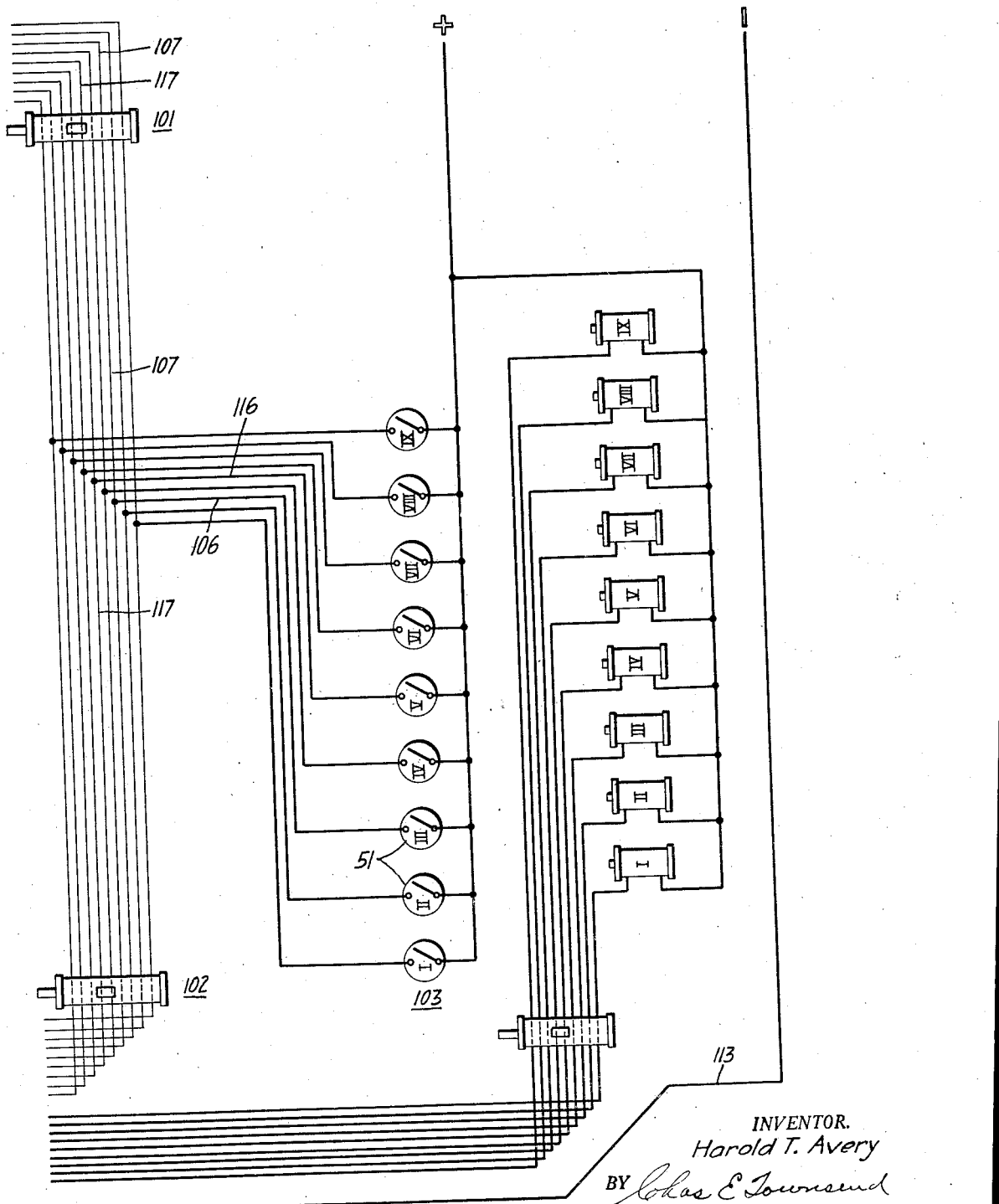
FIG_31A_

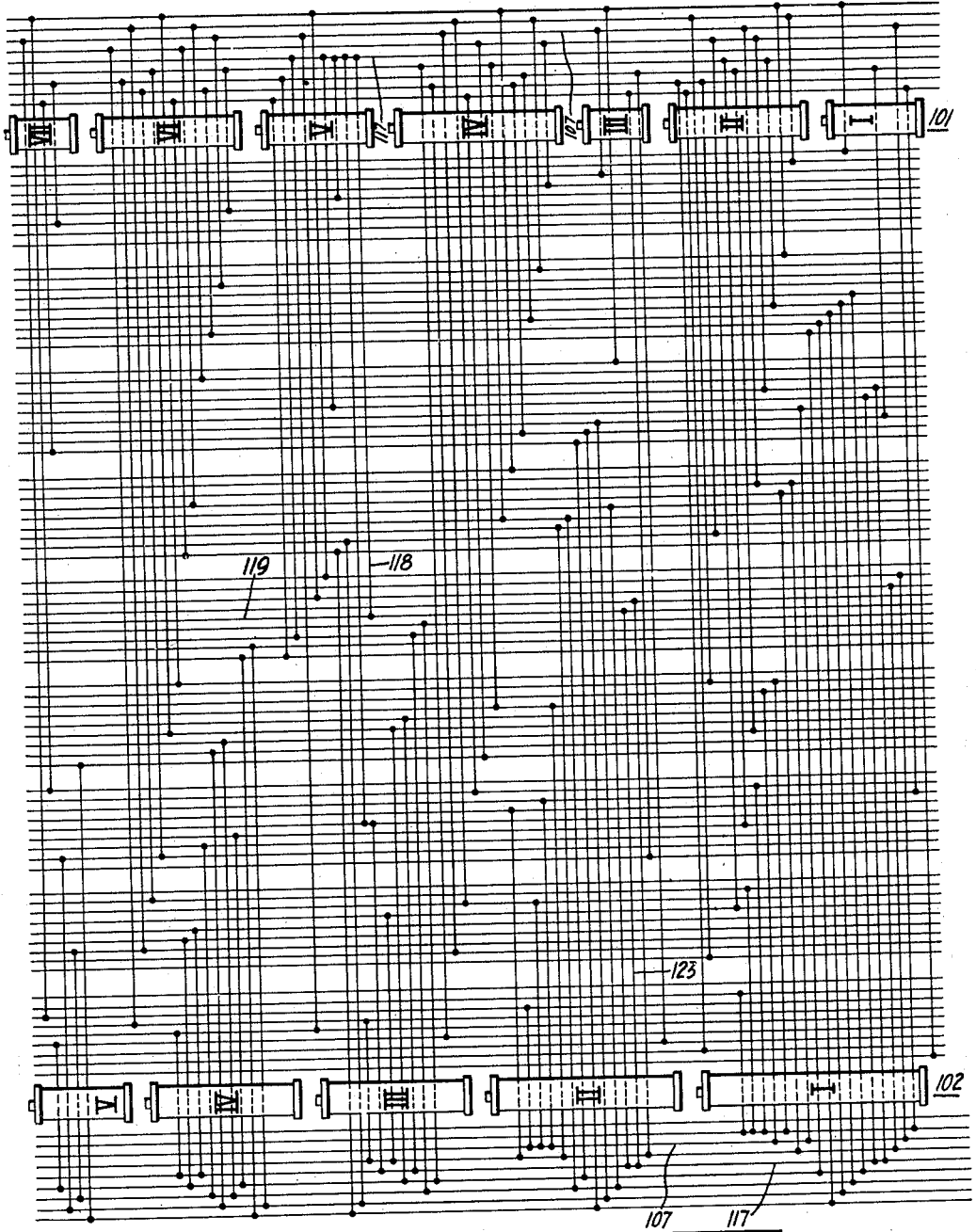
FIG_31B_

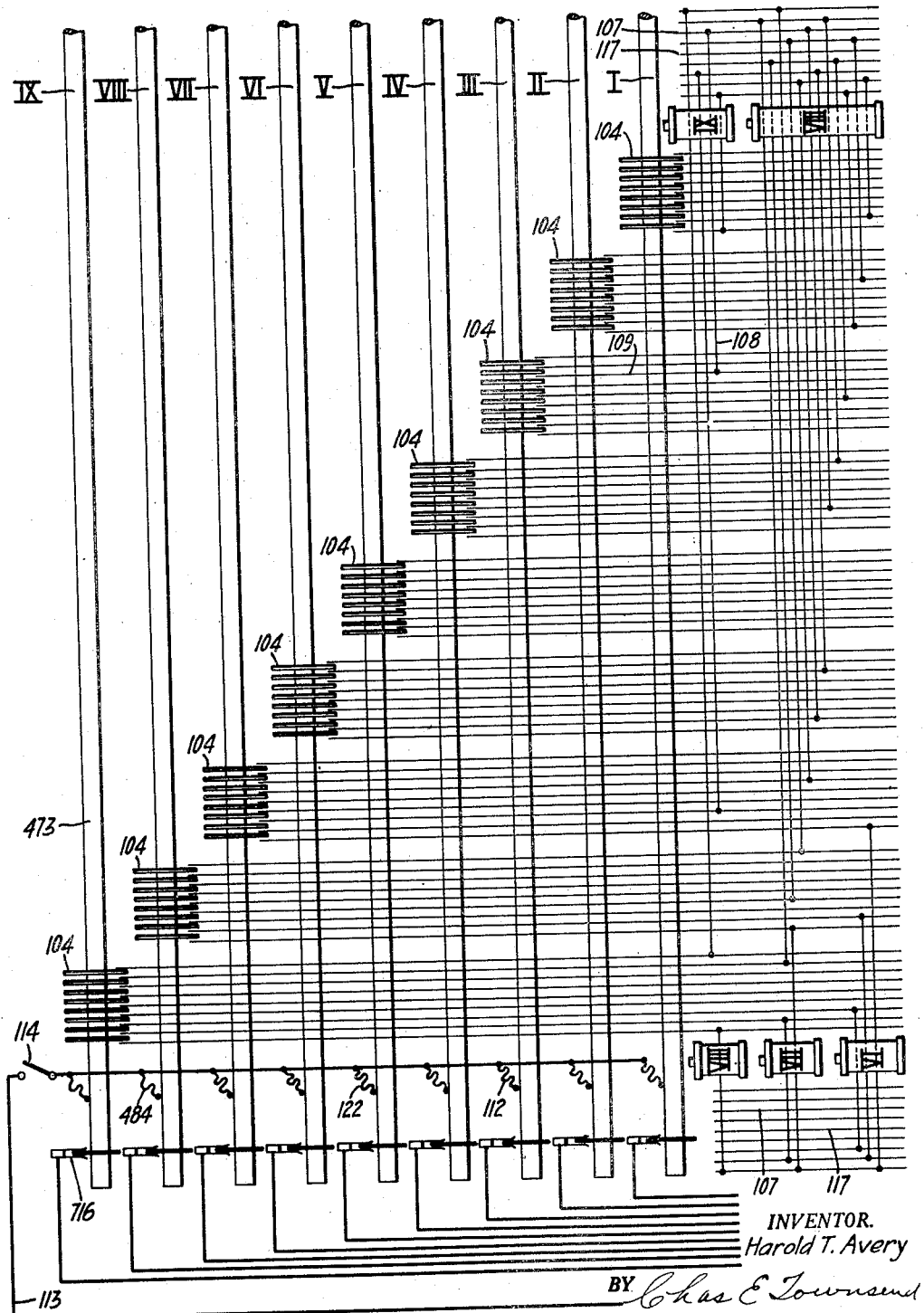
FIG_31C_

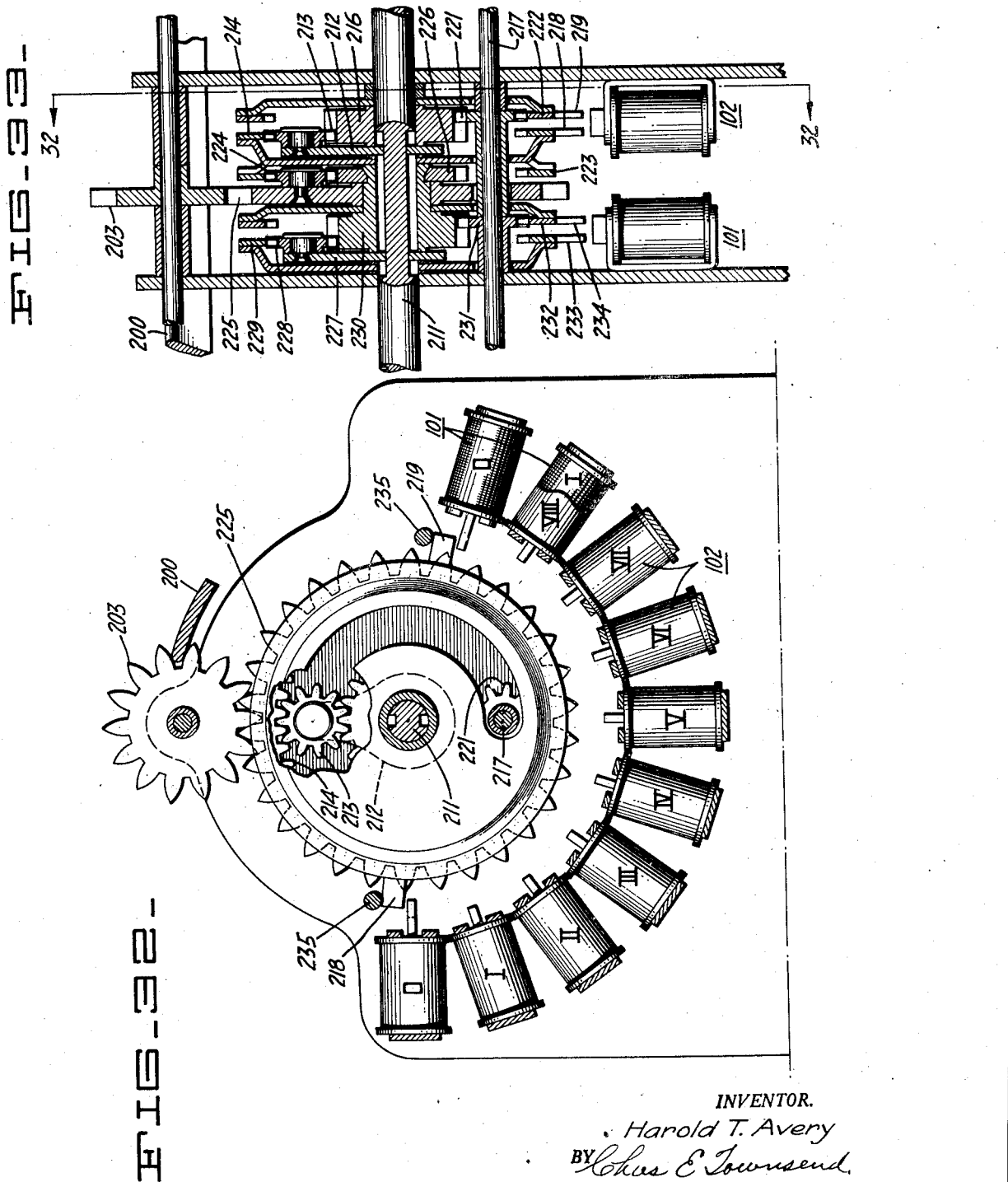

Patented Aug. 26, 1941

2,253,748

UNITED STATES PATENT OFFICE 2,253,748

CALCULATING MACHINE

Harold T. Avery, Oakland, Calif., assignor to Marchant Calculating Machine Company, a corporation of California Application September 23, 1935, Serial No. 41,671

7 Claims. (Cl. 235—61)

The "partial products" type of calculator is distinguished by the fact that its actuating mechanism is controlled jointly by two groups of numeral keys which act through tabular controlling devices to effect operation of the actuator so as to register the product of the numeral keys operated in each group, the term "tabular controlling devices" being used as a general designation of any of various forms of mechanism empirically constructed according to the multiplication table to effect such a result. Since the product of two digits greater than three comprises two digts, it is necessary in such calculating machines to provide means whereby the tabular controlling devices may exercise control over two orders of the actuating mechanism.

In prior devices this has been done by dividing the multiplying cycle into two phases; in the first portion of which the units order digits of the products of each multiplicand digit and the multiplier digit are entered into the totalizer, and in the second phase of which the tens order digits of these products are similarly entered.

Thus, in multiplying 75×9, the first phase of operation would effect the entry of "5" into the units order of the totalizer, and "3" into the tens order of the totalizer; while the second phase would effect the entry of "4" into the tens order of the totalizer and "6" into the hundreds order of the totalizer, giving a product of 675.

The present invention contemplates the elimination of two such separate phases of operation during the cycle, and the effecting of the complete operation in a single phase of operation by providing means whereby the units and tens order digits of a plurality of such products may be simultaneously entered into any given order of the totalizer as a single sum. Utilizing the mechanism of the present invention for the performance of the problem above set forth, "5" would be entered into the units order of the totalizer while the "4" and the "3" would be combined and simultaneously entered into the tens order of the totalizer, and the "6" would be entered into the hundreds order of the totalizer, all in a single cycle.

The invention will be best understood from a consideration of a specific embodiment thereof disclosed in the accompanying drawings, in which:

Figure 2 is a longitudinal sectional view of a multiplicand order with parts broken away to show the key-controlled contact and selection controlling solenoid mechanism.

Figure 3 is a partial lateral sectional view taken on line 3—3 of Fig. 2 of several multiplicand orders, showing the multiplier gang switches in detail.

Figure 3A is a detail sectional view taken on line 3A—3A of Fig. 2 showing the lateral interconnection of the units and tens stop bars.

Figure 4 is a detail sectional view of the carriage dipping mechanism.

Figure 5 is a detail sectional view of the selection segment operating mechanism.

Figure 6 is a detail sectional view of the segment locking gate and its control mechanism.

Figures 7, 8, 9, and 10 are sectional views of the registering mechanism mounted in the laterally shiftable carriage.

Figure 11 is an enlarged detail view of two decimal orders of the registering mechanism, partly in section.

Figure 12 is a longitudinal sectional view of the multiplier control mechanism.

Figure 13 is a detail lateral sectional view of the multiplier control mechanism.

Figure 14 is an additional longitudinal sectional view taken on line 14—14 of Fig. 13 of additional portions of the multiplier control mechanism.

Figure 15 is a longitudinal sectional view illustrating the control of the multiplier registering mechanism.

Figure 16:
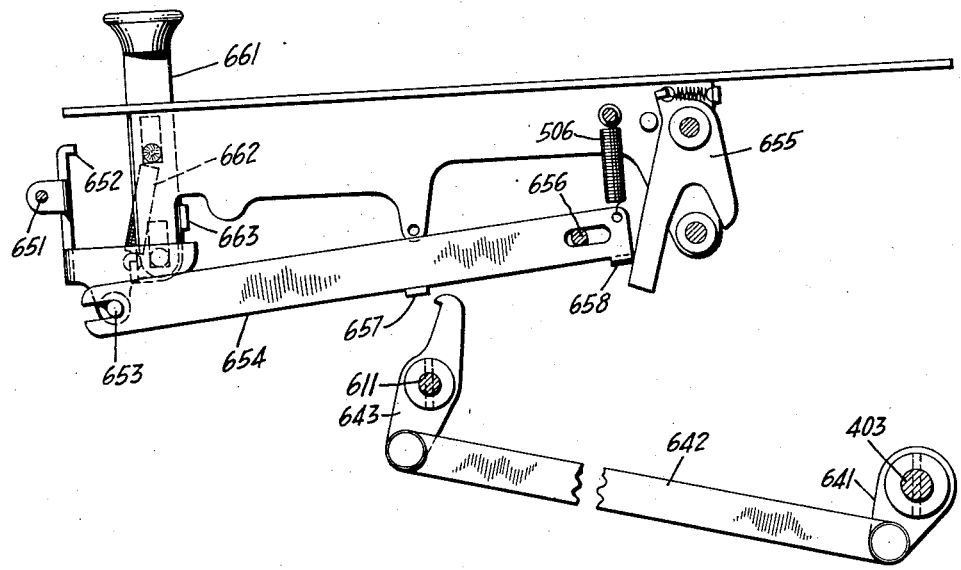

Figure 16 is a longitudinal sectional view illustrating the automatic and manual mechanisms for clearing the multiplicand keyboard.

Figure 17:
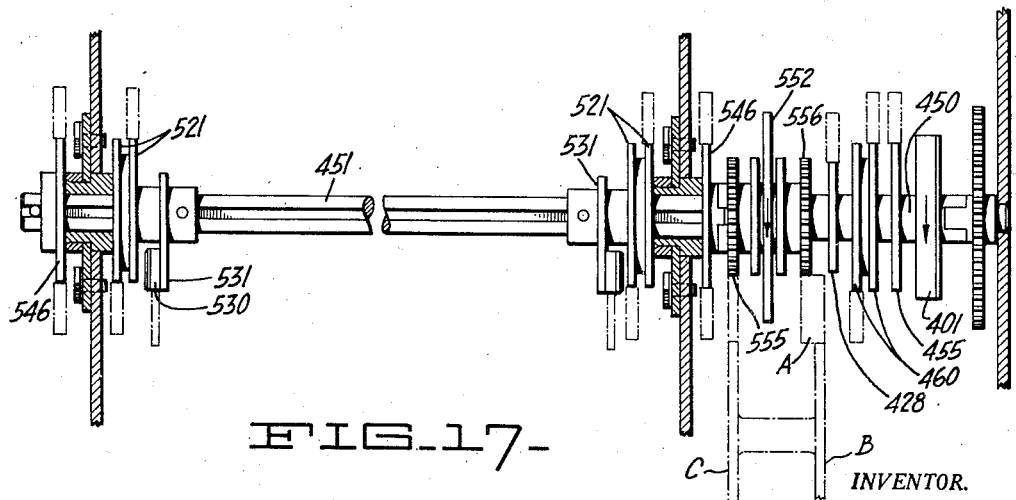

Figure 17 is a lateral view in elevation of details of the main clutch line and control cams driven thereby.

Figure 18 is a detail view of the add and subtract bar mechanism.

Figure 19 is a detail of linkages controlled by the add and subtract bar mechanisms for automatically clearing the multiplicand keyboard and controlling other mechanism.

Figure 20 is a detail of the lock mechanism for the subtraction control.

Figures 21 to 25 are detail views of the reversing mechanism for controlling subtraction operation.

Figures 26 and 27 are detail views of the mechanism for controlling negative multiplication operation.

Figure 28 is a detail view of the special leverage system for controlling operation of the clutch by means of the multiplier keys.

Figure 29 is a longitudinal sectional detail view of the control mechanism for reversibly driving the multiplier registering mechanism.

Figure 30 is a lateral sectional view taken on line 30—30 of Figure 29 showing in detail the reversible drive to the multiplier registering mechanism.

Figures 31A, 31B and 31C are diagrammatic views of the tabular electrical circuit for controlling the solenoid-operated segment stops. By joining Fig. 31A to the right of Fig. 31B and that to the right of Fig. 31C one complete circuit diagram will result.

Figure 32 is a sectional elevation taken on line 32—32 of Fig. 33 of a modified form of solenoid-controlled selecting mechanism; and Figure 33 is a lateral sectional view of said mechanism.

Figure 1:
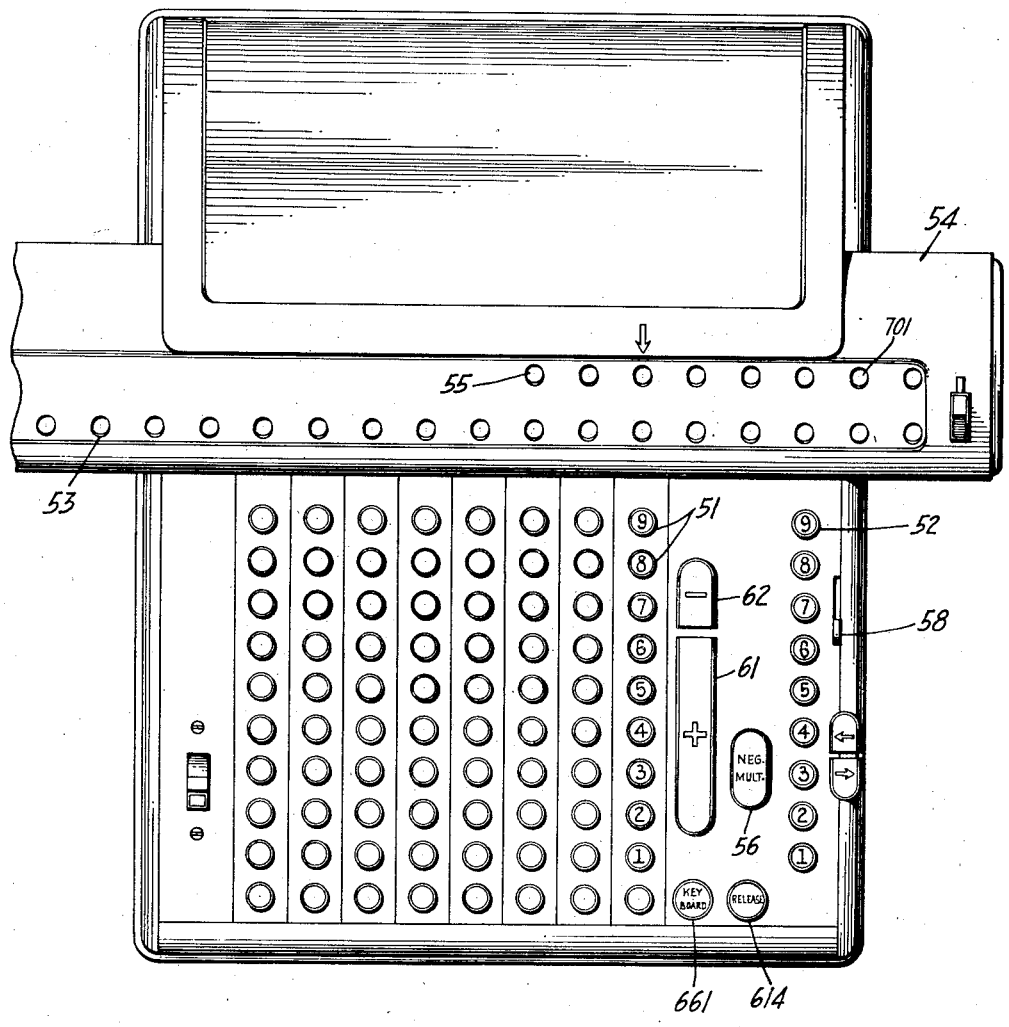
Figure 1 is a plan view of the machine showing the registering mechanism and calculation control devices.

As shown in Figure 1, the machine in general comprises a plurality of banks of multiplicand keys 51, a single bank of multiplier keys 52, and a product register 53, upon which the product is adapted to be indicated upon depression of a multiplier key. The product register 53 is mounted in a carriage 54, laterally shiftable with respect to the actuator, for the purpose of registering the product of multidigit multipliers as hereinafter described, and also carries a multiplier register 55 upon which the respective digits of the multiplier are adapted to be registered successively.

A special negative multiplier key 56 is provided which is adapted to be latched in depressed position to effect the negative registration of the next product, being automatically released thereupon. A control lever 58 is also provided for reversing the direction of operation of the multiplier register 55.

Addition and subtraction keys 61 and 62 duplicate the function of the number "1" multiplier key, with and without the negative multiplier key 56 depressed, respectively, and also effect automatic release of the multiplicand keys 51.

The entire mechanism is supported upon appropriate frame mechanism, enclosed within a casing as shown. and powered by means of an electric motor under the control of the several operating keys heretofore described.

In the herein disclosed embodiment of the invention the multiplicand keys 51 and multiplier keys 52 jointly control tabular controlling devices in the form of electrical circuits acting through two series of solenoids operating mechanical stops in each decimal order of the machine.

As diagrammed in Figures 31A, 31B and 31C these tabular controlling devices comprise banks of units solenoids 101 and banks of tens solenoids 102 adapted to be jointly controlled by switches 103, each under the control of one of the multiplicand keys 51; and gang switches 104, each under the control of one of the multiplier keys 52. The arrangement of the circuits is such that upon depression of one key in each bank, one of the units solenoids 101 corresponding in value to the units order digit of the product of the two digits represented by the two depressed keys will be energized and, if the product is a two-digit number, one of the "tens" solenoids 102 corresponding in value to the tens order digit of said product will be simultaneously energized.

For example: assuming that the "3" key in each bank is depressed for the purpose of registering the product of three times three, or "9," current will pass from the side of the supply line marked "Plus" through closed switch III in bank 103 via lead 106 to lead 107 passing through the "0" solenoid bank 101 energizing the same to withdraw its normally ejected stop pin and permit the registration of a significant digit by the mechanism controlled by said bank of solenoids.

Thereafter current from said lead 107 is prevented from passing through the solenoid I of bank 101 by the fact that gang switch 7 of bank 104 is open. Likewise, current cannot pass from lead 107 through solenoid II of said bank because gang switch 4 of bank 104 is open; nor through solenoid III because gang switch I is open; nor through solenoid IV because gang switch 8 is open; nor through solenoid V because gang switch 5 is open; nor through solenoid VI because gang switch 2 is open; nor through solenoid VII because gang switch 9 is open; nor through solenoid VIII because gang switch 6 is open.

However, it can pass through solenoid IX because gang switch 3 is closed, and hence current will pass through said solenoid IX of bank 101 via lead 108 which includes one of a plurality of windings of said solenoid upon any energization of any of which the control pin of the solenoid, normally retracted, will be ejected to act as a mechanical stop for the mechanism hereinafter described.

As diagrammatically illustrated in these figures, each of the solenoids of each bank has wound upon it a plurality of insulated wires from one to seventeen in number, as indicated, thus providing a plurality of windings completely insulated from each other, upon energization of any of which the control pin will be operated. The indicated number of wires will, preferably, be bundled together and wound simultaneously, although obviously they may be wound in other ways.

From lead 108, as above described, current passes to lead 109, and thence to closed gang switch III of bank 104 connecting it to the III shaft 473, which shaft is electrically connected through flexible lead 112 to lead 113 connected to the side of the supply line marked "Minus." Switch 114 is interposed in said lead for the purpose of maintaining the tabular control circuits normally open, and is mechanically closed during each cycle of operation as will be hereinafter specifically described.

It will be noted in the foregoing example that none of the several circuits through the solenoids of bank 102 are closed, the circuits from lead 107 through the I solenoid of bank 102 being open at gang switches 5, 4 and 6 respectively, of bank 104, the circuit passing through solenoid II of bank 102 being open at gang switches 7, 8 and 9 respectively, of bank 104, and no connection existing between any of the remaining solenoids of bank 102 and the lead 107.

For the purpose of considering an operation involving a two-digit product, the operation may be considered in which the "5" keys of each bank are depressed for the purpose of registering the product of five times five, or "25." From the side of the supply line marked "Plus" current will then pass through the key controlled switch numbered V of bank 103 to lead 116 and thence to lead 117. Of the solenoids in bank 101, only those numbered V and 0 have any connection whatever with lead 117, but current will pass from said lead 117 through lead 118 which includes one of the several windings of solenoids V and 0 of bank 101 to lead 119 and thence to gang switch V of bank 104 which has been closed by depression of the number V multiplier key, connecting said lead 119 to the V shaft 473, which in turn is connected by flexible lead 122 to the lead 113 connecting to the side of the supply line marked "Minus."

Referring to the solenoids of bank 102, it will be noticed that the two connections to lead 117 which pass through the I solenoid of said group are open at gang switches III and II respectively; thus, connections which pass through solenoid III of said bank are open at gang switches VI and VII respectively, and that the connections thereto which pass through solenoid IV of said bank are open at gang switches VIII and IX respectively, of bank 104, while no connection whatever exists between solenoids V, VI, VII and VIII of said bank and said lead 117; however, current may pass from said lead 117 through the 0 solenoid winding to lead 123 which includes one of the windings of the solenoid II of said bank 102 and thence to lead 119 connected to the side of the supply line marked "Minus" through the gang switch V of bank 194 which has been closed as heretofore described.

Thus, upon depression of the "5" keys of each bank, the V units solenoid of bank 101 and the II tens solenoid of bank 102 will be energized, ejecting their pins to control the registering mechanism hereinafter described. The 0 solenoid of both banks 101 and 102 will likewise be energized since lead 117 includes one of the windings of each of said solenoids, and their normally extended control pins will thereby be retracted permitting registration to occur.

From the foregoing example the circuit connections by which the solenoid corresponding to the product of any keys depressed in the multiplicand and multiplier bank are energized, may be traced by reference to Figures 31A, 31B, and 31C, it being understood that this circuit diagram is illustrative of only a single decimal order of the machine which, as will be observed from the description following, is composed of a plurality of orders of multiplicand keys cooperating with a single order of multiplier keys.

As shown in Figures 2 and 3 each bank of multiplicand keys 51 is mounted in a unitary assembly comprising an upper face plate 151 apertured to pass the keys 51 and providing an abutment against which lugs 152 on the sides of the key stems may bear. Fixed to plate 151 is a member 153 apertured to guide the stems 154 of keys 51 which stems are provided with lugs 155 adapted to cooperate with a latch bar 156 slidably mounted on the under side of member 153 and urged to the left by a spring 157 compressed between an upturned end of the latching slide 156 and the member 153. Keys 51 are normally maintained in raised position by individual coil springs 158 compressed between the upper side of member 153 and the lug 152 of each key stem, but upon depression of any key its lug 155 first moves latch bar 156 to the right (as viewed in Figure 2) compressing spring 157 and then, upon complete depression of the key, spring 157 moves latch bar 156 back to the left, latching the key in depressed position. The lug 155 of the "0" key of the bank is made longer than the corresponding lugs of the other keys so that during the time it is depressed, latch bar 156 may not move back to the left, and hence this key may not be locked in depressed position but can be used only to release other depressed keys in the same bank.

The several banks of keys 51 are supported in side by side relationship upon cross-frame members 161 and 162, respectively, and each overlies a corresponding contact bank 103 supported in operative relationship therewith by saddle members 163 and 164, respectively, supported at each end in the main frame members of the machine. Each of these contact banks 103 comprises a sleeve 166 of insulating material in which are resiliently supported a series of individual contacts 167 and a common contact strip having struck up lugs 168 overlying each of said contacts 167. Movably mounted in the upper portion of said sleeve are operating buttons 169, of insulating material, overlying the spring lugs 168 respectively, and each underlying one of the key stems 154 so that upon depression of any key 51 the stem 154 thereof will depress the contact button 169 directly underlying it, flexing spring lug 168 and bringing it into contact with contact 167 to close an electrical circuit between the two last-mentioned members for the purpose explained in connection with the diagrammatic figures numbered 31A, 31B, and 31C.

The solenoids of banks 101 and 102 are preferably arranged in inverted relation with respect to each other as shown in Figure 2. Each solenoid consists of a central tubular member 171 within which is slidably mounted a non-magnetic pin 172 having a magnetic portion 173 fixed to one end thereof and normally maintained in the position shown by coil spring 174. Wound upon the sleeve 171 are a plurality of mutually insulated windings 176, energization of any of which is adapted to carry the magnetic portion 173 of the core toward the center of the winding 176, ejecting the pin 172 against the action of spring 174 to substantially the position in which the pin 172 of the zero solenoid is shown and in which the latter is normally maintained by a corresponding spring acting oppositely upon its core. Energization of the "0" solenoid is adapted, therefore, to effect retraction of its pin upon drawing the magnetic portion thereof toward the center of the energized coil.

Each solenoid assembly is adapted to be received within an individual recess in a frame of cast insulating material 181 supported in cross members 182 and 183 fixed in the side frames of the machine and at the rear by a cross rod 184.

On its upper side, each of the members 181 is provided with notched pins 186, each having a portion of reduced diameter upon which a slidable stop bar 191 is mounted for horizontal movement. Stop bar 191 is provided with a separate cut out portion adjacent each of the stop pins 172 so arranged with respect to each of the stop pins 172 that when the pin of the #2 solenoid is ejected the bar is permitted to move twice as far to the right as when the pin of the #1 solenoid is ejected, and so on up to the #9 solenoid in each bank, a differential movement of the stop bar 191 corresponding to the value of the energized solenoid being thus obtainable.

A similar stop bar 192, similarly mounted on the under side of block 181 is subject to control by the solenoids of bank 102 in a similar manner so that a differential movement thereof corresponding in amount to the value of the energized solenoid of that bank is likewise obtainable.

The rightmost end of stop bar 191 is connected by vertical link 193 pivotally attached to an upturned ear on said stop bar with the rightmost end of the stop bar 192 associated with the next bank of keys to the right, the assembly of bars 191, 192, and link 193 forming a differential linkage, as shown in Figures 2 and 3A so that the movement of the middle portion of link 193 will be proportional to the sum of the movement of bar 191 of one order and bar 192 associated with the next lower order. By this means a summation may be effected of the tens of a product of one multiplicand digit with a given multiplier and the units of another multiplicand digit with the same multiplier so that the sum thereof may be simultaneously entered into the same decimal order of the registering mechanism, as hereinafter described.

Entry of said sums into the accumulating mechanism is effected by the three-armed levers 194 pivotally mounted on the shaft 195 and having an elongated slot engaging over pin 196 located centrally of link 193. Each actuating segment 197 mounted for oscillation about the shaft 198, is provided with a short, slotted arm 199, the slot of which is engaged by a pin 201 on a second arm of each lever 194, the arrangement being such that after the zero stop pins 172 have been retracted, spring 202, tensioned between a third arm of said lever 194 and the frame of the machine, is permitted, by the operation controlling mechanism, hereinafter described, to rock said lever 194 clockwise, rocking rack 197 counter-clockwise a differential amount proportional to the sum of the movement of stop bar 191 in the same order as the segment and stop bar 192 in the order to the right thereof. Intermediate gears 203 engaged by the segments 197 are thus rotated by the same respective differential amounts and may enter said amount into the accumulating mechanism mounted on the shiftable carriage either additively or subtractively in the manner hereinafter described.

An alternative arrangement for effecting summation of digits to be entered in a single decimal order of the accumulating mechanism is shown in Figures 32 and 33 in which the controlling solenoids of banks 101 and 102 are arranged in a circular arc for cooperation with a differential planetary gearing assembly adapted to effect summation of the factors.

Such planetary assemblies are carried by a shaft 211 adapted to be rocked by the motor through a uniform excursion (in the illustrated embodiment, about 108°) during each cycle of machine operation. The means for thus rocking said shaft, not shown, corresponds to the means used for rocking the segment control gate 535 of Figure 2, and a lock gate 200 corresponding to the lock gate 517 of said Figure 2 may also be provided.

Each decimal order comprises two planetary assemblies adapted to effect summation of the "tens" of products resulting from the setting of multiplicand keys in the next lower decimal order, and the "units" of products resulting from the setting of multiplicand keys in the immediate decimal order. For this purpose the "tens" solenoids 102 of Figures 32 and 33 are controlled by the tabular circuits associated with the next lower bank of multiplicand keys, while the "units" solenoids 101 are controlled by the tabular circuits associated with the immediate bank.

The "tens" differential planetary assembly comprises a planetary carrier 212 keyed to power rocked shaft 211 and having journaled thereon a planetary pinion 213 meshing with a ring gear 214 and a sun gear 216, both of which are freely rotatable on shaft 211.

This construction is such that as shaft 211 is rocked, as above described, planetary pinion 213 is orbitally advanced about the center of shaft 211, tending to rotate both ring gear 214 and sun gear 216 with which it is in mesh. If rotation of either of these gears is prevented, however, pinion 213 will rotate as it feeds over the stationary gear, and the free gear will thus be rotated at a double rate.

Also in mesh with the sun gear 216 is a planetary pinion 221 rotatably mounted on shaft 217 and meshing in turn with a ring gear 222. Ring gear 214 is provided with a lug 218 and ring gear 222 is provided with a similar lug 219 adapted for cooperation with ejected pins of the tens solenoid bank 102. Also carried by the same spider as supports ring gear 214 is a ring gear 223 meshing with a planetary gear 224 rotatably mounted on actuator gear 225 in mesh with intermediate gear 203 which, as heretofore described, is the actuator intermediate gear for the carriage accumulator mechanism hereinafter described.

Assuming, for instance, that a V stop pin has been ejected by the V solenoid of this tens bank 102, then upon rocking of the shaft 211 in a counter-clockwise direction (as viewed in Figure 32), the planetary carrier 212 carrying planetary pinion 213 will likewise be moved in a counter-clockwise direction, moving ring gear 214 in the same direction and causing its stop lug 218 to approach the ejected stop pin. This operation will also cause counter-clockwise movement of the sun gear 216 rotating the fixed planetary gear 221 in a clockwise direction and feeding ring gear 222 in a clock-wise direction to cause its stop lug 219 to approach the ejected stop pin from the opposite direction. If the lug 219 of ring gear 222 encounters the ejected stop pin first, the locking of sun gear 216 thus effected will accelerate further movement of ring gear 214 until its stop lug 218 contacts the same ejected stop pin; but if the stop lug 218 of ring gear 214 contacts the ejected stop pin of the solenoid first, the remainder of the rocking movement of shaft 211 will similarly accelerate movement of ring gear 222.

The amount of rock shaft 211 necessary to bring lugs 218 and 219 firmly against the opposite faces of an ejected stop pin is the same regardless of which stop pin is ejected, but the advance of ring gear 214 will always be proportional to the numeral value of the controlling stop pin.

This differential movement of ring gear 214 is participated in by ring gear 223 which is functionally integral therewith and is transmitted by ring gear 223 through planetary pinion 224 to actuator gear 225 in mesh with gear 203 which drives the accumulating mechanism, assuming, of course, that the sun gear 226 meshing with pinion 224 is locked. The function of this sun gear 226, however, is to permit the summation of a second value with the value selected by the mechanism just described so that the two may be combined and simultaneously entered into the accumulating mechanism by gear 203.

For this purpose a second planetary assembly cooperating with the units bank of solenoids 101 is also provided in each order. This assembly comprises a planetary carrier 227 keyed to the shaft 211 and carrying planetary pinion 228 meshing with ring gear 229 and sun gear 230. Also meshing with sun gear 230 is a planetary pinion 231 rotatably mounted on shaft 217 and meshing in turn with a ring gear 232 similar in function to the ring gear 222 hereinbefore described. Ring gear 229 and ring gear 232 are provided with stop lugs 233 and 234, respectively, adapted for cooperation with ejected stop pins of the units bank of controlling solenoids 101, just as lugs 218 and 219 cooperate with stop pins of bank 102. The solenoids in this alternative embodiment of the invention are arranged to inverse order as to values with respect to the solenoids of the units bank 102 so that (as viewed in Figure 32) the #9 solenoid of bank 101 is behind the zero solenoid of tens bank 102 shown. There is, of course, no necessity for a IX solenoid in the tens bank 102.

Assuming, for instance, that the V stop pin of the units bank of solenoids 101 has been ejected, then upon rocking movement of shaft 211 in a counter-clockwise direction (as viewed in Figure 32) planetary pinion 228 will be moved in a counter-clockwise direction rotating ring gear 229 and sun gear 230 in a counter-clockwise direction. During such movement, planetary gear 231 will be rotated in a clockwise direction, rotating ring gear 232 in a clockwise direction, so that the lugs 233 and 234 of both ring gear 228 and ring gear 232, respectively, will be brought against the ejected stop pin, effecting a differential advance of ring gear 232 in the same way that a differential advance of the ring gear 214 was effected in the foregoing description of the tens order operation.

The differential advance of ring gear 232 will be transmitted through pinion 231 to sun gear 230 which will thus be advanced in a counter-clockwise direction by an amount proportional to the numerical value of the controlling stop pin.

Sun gear 226, previously referred to in connection with the tens selection mechanism, is fixed on the hub of the sun gear 230 and will thus be rotated in a counter-clockwise direction by the same amount and will rotate the planetary pinion 224 in a clockwise direction to advance the actuator gear 225 by an amount proportionate to the units selection at the same time as it is being advanced by ring gear 223, as hereinbefore described, an additional amount proportional to the tens selection. Rotation of ring gear 223 and sun gear 226 will therefore concurrently advance planetary pinion 224 and actuator gear 225 an amount equal to the sum of the movements of both said sun gear and said ring gear resulting in the entry into the accumulator of the sum of the two digits involved.

The return movement of shaft 211 effects the return of lugs 218, 219, 233, and 234 against their back stop shafts 235, and, in the same way as in the advance of these lugs, one will be accelerated if its companion reaches the stop shaft first. Obviously, gear 203 will be returned the same number of teeth during such operation as it has been previously advanced.

It is an outstanding advantage of this construction, that the actuator gears 203 are positively driven through the selected distance in each direction of their movement.

*Accumulating mechanism*

From the foregoing description of the actuating mechanism, it will be apparent that numbers in excess of "10" may be entered into a given order of the accumulating mechanism via intermediate gears 203 during a single cycle of operation and it is therefore necessary to provide accumulating and tens carry mechanism adapted for such operation.

In the present machine this function is accomplished by accumulator mechanism mounted in a carriage 54 (Figures 1 and 7 to 11, inclusive).

The carriage construction comprises end plate supports supplemented by a series of carriage brace plates 255 mounted at even intervals between the two end plates and having lugs 261 projecting through spaced slots in the carriage frame plate 252 and supported at the front of the carriage by an angular portion of the top plate, as shown. Lock spacing combs 263 extend through spaced slots in each brace plate and are locked in place by rods 264, while the frame plate spaces adjacent plates 255 by receiving the lugs thereof through spaced apertures and slots therein. A retaining comb 265, fixed to the plate 252 also spaces the rear edges of the plates 255 and by underlying lugs formed on said plates serves to hold lugs 261 in their notches in the top plate.

Supported in the end plates and by the several brace plates 255, is a cross rod 262 which serves as a pivotal support for a series of plates 266, one of which is mounted on said rod 262 adjacent each of the carriage brace plates 255. These plates 266 are spaced and braced adjacent their forward ends by comb 267 interlocking with slots in each plate 255 and held in place by rod 268. The plates are also connected at their rear end by a common bail 269, known as the "dipping bail," by means of which the entire body of plates 266 can be simultaneously oscillated about shaft 262 during operation, as hereinafter described, in which description the mechanism supported by said plates 255 is referred to as the "dipping carriage."

The units of the accumulator are assembled on a shaft 270 supported by plates 255, there being one of such plates 266 between each adjacent unit, so that each unit forms a separate assembly between two of said plates. Each unit is adapted to be driven by one of the selection gears with which intermediate gears 271, rotatably mounted on shaft 272 and entrained with the gears 203 of the several accumulator units, may be meshed by lowering the dipping carriage, as hereinafter described. Suitable clearances are provided on the several plates 255 to permit the necessary connections between the orders of the accumulator for effecting tens transfer or carry operation.

Referring more particularly to Figure 11, it will be noted that each accumulator unit comprises a spider 274 which is rigidly secured to a sleeve 275 on shaft 270. This spider 274 carries an internal ring gear 276 on its right hand side, which is spot welded or riveted to the flared out portion 277 of each of the spider arms. A right angular extension 278 of one of said arms projects toward the right from said spider, slightly beyond the right side face of a thin shell 279 fixed to the spider 274 and the internal gear 276 thereon, and serves as a zero stop in resetting operations described hereafter. The periphery of said shell 279 is sufficiently wide to accommodate the digits ranging from "zero" to "nine" arranged as shown. Integral with the sleeve 275 surrounding said shaft 270 is a sun gear 280 abutting a brace plate 266, and interposed between said sun gear 280 and the spider 274, is a snail cam 281 and spacer 282.

The snail cam 281 has an aperture through which projects a lateral extension 283 of spider 274, thus causing said cam and spider to rotate as a unit and the sleeve 275 is riveted over the spider forming these parts into a functional unit.

Located immediately to the right of mechanism just described is a plate 292 fixed to the spur gear 273 which is driven by a gear 203 through an intermediate gear 271 when plates 266 are dipped. These elements are rotatably mounted on a sleeve 293 which in turn is rotatably mounted on a sleeve 294. Plate 292, which includes an apertured ear 295 for use in timing, as will presently appear, is, in turn, fixed to a member 296 by studs 297 provided at each end of said member, and on each of said studs is mounted a planet gear 298 meshing with the ring gear 276 carried by spider 274 and with another sun gear 299 formed integrally with sleeve 293. Thus, the spur gear 273, the plate 292, the planet gears 298, and the ring gear 276, constitute a planetary assembly which rotates about the sun gear 299 and comprises the means by which the numeral bearing shell 278 can be rotated by the actuating mechanism of the machine which drives the gear 271 as hereinafter described.

Secured to the right end of the above mentioned sun gear sleeve 293 is a spider 300 carrying an internal gear 301, the spider and gear being provided with four lugs 302 which serve as assembly guides and as stops, as hereinafter described. The spider also includes four apertured ears 303 for use in timing, as will appear.

For the purpose of carrying tens, means are provided for driving the spider 274 and its associated dial shell 278 by means of the spider 274 of the next lower order independently of any movement of gear 273. This means includes the aforementioned internal gear 301 and another unit sub-assembly now to be described. Sleeve 294 which, as previously described, supports the sleeve 293 on shaft 270, is provided with a double arm member 304, one arm 305 of which is apertured, while to the other, 306, is secured a stub shaft 307 to which are fixed planet gears 308 and 309. The planet gear 308 meshes with the internal gear 301 on spider 300 while the planet gear 309 meshes with the sun gear 280 of the adjacent lower order. Sleeve 294 includes an integral spacer 310 so that gear 308 is positioned in alignment with ring gear 301 and does not abut the spider 300, and the end of the sleeve is riveted over to secure member 304, thus providing another unit assembly. The central portion of member 304 is equipped with a gear segment 311 meshing with teeth 312 (Figure 8) formed on a lever 313 pivoted to a shaft 272 which is mounted parallel to the shaft 270 in the plates 266. Lever 313 includes an extension 314 engaging a lever 315 also mounted on shaft 272 which lever carries a roller 316 in the same plane as snail cam 281. Lever 313 is urged clockwise by spring 317 so that the roller 316 carried by lever 315 is urged thereby into contact with the adjacent snail cam 281. In the units order the sleeve 293 may be secured directly to the plate 266 adjoining it at the right, inasmuch as there is no lower order from which tens must be carried.

This arrangement of the several accumulator units permits simultaneous digitation and tens transfer operations known in the art as "duplexing."

In operation, the gear 273 is driven by the actuating mechanism and revolves planetary gears 298 about shaft 270 as a center. Where, as in the units order, the sleeve 293 with its sun gear 299 is fixed, this revolution of gears 298 will, since they are in mesh with sun gear 299, cause them to also rotate about studs 297 and thus drive ring gear 276 ahead in the direction in which gear 273 is being driven. Since ring gear 276 is fixed to the indicia bearing shell 278, this movement will bring a figure opposite the sight opening 318 in the carriage cover, indicative of the portion of a rotation given gear 273.

Whenever a given amount is thus entered in any one unit of the accumulator, one-tenth of that amount will be entered in the next higher unit by means of the carrying mechanism comprising sun gear 280 fixed to spider 274 and driving planetary gears 308 and 309, these, in turn, driving internal gear 301 fixed to sleeve 293 of the next higher unit in a direction opposite to that of spider 274, and, by rotating said sleeve, driving sun gear 299 integral therewith. If gear 273 and studs 297 are stationary, the movement of sun gear 299 rotates ring gear 276 in the direction opposite to that of gear 299 and therefore in the same direction as that of the lower order dial transmitting the carry. If gear 273 is moving to introduce digitation, as previously described, ring gear 276 will move by an amount equal to the resultant of the movement produced by the rotation of gear 299 and that produced by the rotation of gear 273, the movement of the ring gear, of course, being the resultant of the movement of the sun gear and the displacement of planetary centers. Thus the movement of any higher order dial becomes the resultant of the digitation entry into its own order and the carry movement from the next lower order.

The gear ratios are in usual practice, of course, such that the carry movement received by the higher order dial is one-tenth of that of the lower order dial. The typical arrangement to produce this result is as follows: sun gear 280—ten teeth; planetary gears 308 and 309—fifteen teeth; ring gears 274 and 301—forty teeth; sun gear 299—sixteen teeth; and planetary gears 298—twelve teeth. With this arrangement, one full clockwise turn of a lower order dial rotates sun gear 280 ten teeth, advancing ring gear 301 next to the left, ten teeth or one-quarter turn counter-clockwise. This advances sun gear 299 integral therewith, one-quarter turn, or four teeth counter-clockwise, which in turn advances ring gear 276 on the higher order assembly four teeth, or one-tenth turn clockwise. This carry movement will in turn impart one-hundredth of a turn to the dial next higher than that receiving the original carry movement; one-thousandth of a turn to the dial next higher than that, and so on.

With this gear arrangement, sun gear 299 having four-tenths as many teeth as ring gear 276, one full turn of digitation gear 273 will produce one and four-tenths turns of ring gear 276. Therefore, if gear 273 is made a fourteen-tooth gear, each tooth advance of the gear will produce one-tenth of a turn of ring gear 276, or one figure advance of the dial.

In order that this tens-carrying movement may be properly transmitted to all units of the accumulator, it is desirable that digitation gears 273 move only in accordance with values being introduced into the accumulator. To this end means are provided to prevent movement of the gears 273 except as values are being introduced. This means comprises spring pressed pawls 319, freely mounted on shaft 320, each of which is adapted to engage the associated intermediate gear 271 in each order. As described above, these gears 271 mesh directly with the gears 203 of each accumulator unit and each pawl 319 therefore acts as a retaining means for one of said gears.

being released during actuation, as will presently appear.

Thus, from the foregoing description, it is apparent that rotation of a numeral wheel in any order will cause all the numeral wheels in the higher order or to the left thereof, to also rotate a certain amount successively either in additive or subtractive direction, depending upon the direction of rotation of gears 273, while in all the orders of a lower value or to the right of the last order in which digitation takes place, no such fractional values are entered.

By virtue of this continuous gearing between the various orders, the dials are advanced so that the numerals are not properly lined up at the sight openings 318, and, in order to overcome this condition and render a readable indication of the result, mechanisms have been provided which will turn every numeral wheel to proper alignment with said sight openings directly after an actuation.

The mechanism for attaining this lineup operation of said dials comprises the snail cam 281 which is secured to the left side of each spider 274, and which cooperates with and serves to position the indirectly spring tensioned lever 315 pivoted at 272 (Figure 7). In this figure the snail cam 281 and lever 315 are shown in a position in which the roller 316 on said lever contacts with the high point of said snail cam, which high point represents the zero position of its associated dial wheel 279. The contour of said snail cams is proportioned in such a manner that each higher digit up to nine on the dials is represented by a successive decrease in radius until the lowest point on said cams represents the digit "9" on said numeral wheels; the values increasing on the dials as well as on the cams in clockwise direction, so that for addition the dials and cams are rotated in counter-clockwise direction and for subtraction in clockwise direction, when viewing the machine from the right hand side.

As the carriage is moved down into lowered position, a notched extension 340 on lever 313 engages shaft 339 which is extended through plates 255. This rocks lever 313 counter-clockwise with the notch, engages shaft 339 and results in member 304 moving clockwise to revolve gears 309 and 308 about shaft 270. This results, as will be apparent on reference to Figure 11, in the carry from the right, received by gear 309 from gear 280 with which it is meshed and which is in the next order to the right, being entered into the next higher order. When the dipping carriage is in its lowered position, lever 315 is freed by lug 314 and permitted to fall to a position in which roller 316 is just clear of snail cam 281. Under these conditions, sleeve 294 and stud 307 are held in fixed positions, and each dial is in general advanced to a partial position depending on the digitation it has received and the carry from all orders to the right. For instance, if the resultant value entered is "2,375", the first dial stands between a "2" and a "3" registration, being 0.375 of the way from the "2" to the "3" registration. The next dial stands 0.75 of the way from a "3" to a "4" registration, the next 0.5 of the way from a "7" to an "8" registration, and the next dial squarely at a "5" registration.

When the calculating is completed and the dipping carriage raised, it is desired to back up each dial by the fractional amount it stands ahead of an even registration to secure a clear registration in the sight openings. To this end, each lever 313 is allowed to rock clockwise under the tension of spring 317 until roller 316 rests against snail cam 281 which, with the cam shaped as already described, allows lever 315 to rock clockwise by an amount proportional to the registration on the dial to which the cam is attached. Lever 315 thus serves to limit clockwise rocking of segment 313 to an amount proportionate to dial registration, thus insuring a proportionate counter-clockwise rocking of segment 304, thus carrying stud 307 forward by an amount proportional to the registration on the dial to the right of it, thus rocking ring gear 301 by a corresponding amount and backing up thereby the next dial to the left by an amount proportional to the registration of the next lower dial, which is the amount by which the dial stood ahead of an even position. The arrangement is therefore such that each increment of carry received from a lower order will be backed out upon completion of the calculation, unless the increment amounts to an entire position, in which case the high portion of the snail cam standing under the roller prevents such backing out. The result is that when the dipping carriage is raised, each dial is controlled by the snail cam on the next lower order dial so that the proper figure will be squarely lined up to its sight opening.

Only the dial immediately to the right affects the backing up of a dial and the increment of carry in any one dial is not backed out entirely until that in the one immediately to the right is removed. Thus the task of having the last dial distinguish between two values, as "29,998" and "30,001" is obviated. Thus, with "29,998", when the dipping carriage is returned, the "2" dial is not returned until the dials to the right have returned. Then the "2" dial is moved back only 0.9000 of the way and not 0.9998 of the way, the 0.0998 of a turn having been previously backed out.

If a value to be displayed upon the completion of a calculation involves a series of nines as in the figure 29,998 above mentioned, or as always occurs in case an overdraft has been made (that is, when a subtraction has been made with a subtrahend greater than the minuend), the dials which are to display the nines will stand substantially at zero except the extreme dial to the right of this series. As the extreme right dial is brought fully into its "nine" position by the removal of any increment of carry in the manner previously described, the roller is allowed to follow down to the lowest radius of the cam, thus backing the next higher order dial by very nearly a full step. If the higher order dials were already standing substantially at zeros, the backing up operation would thus bring each in turn to a nine which would allow the roller in that order to drop from the high portion of the cam down to the low radius of that cam. This dropping of the roller would in turn back the next higher order up one step which, if the dial were standing substantially at zero, would result in a repetition of the process. Thus, if with a series of dials standing at zero, the extreme right dial in the line is backed up to a nine registration, a carry wave results in which each of the dials successively moves from "zero" to "nine", each dial commencing its backward movement only when the next dial to the right has allowed the roller to drop over the corner of the high point of the cam and proceeds to drop far enough to bring the order in question into operation.

The carriage is supported in the machine for transverse shifting in either direction by shafts 259 and 260 which slide through bushings positioned in side frames on opposite sides of the machine.

Accumulator clearing mechanism

It may be seen from the foregoing description that if ring gears 301 be locked against movement while segments 313 are rocked, then the teeth 312 will act to rock arms 304 and rotate planetary pinions 308 and 309 by feeding pinions 308 over the teeth of locked ring gears 301. If the gears 271 be now freed from the braking action of pawls 319, the rotation of planetary pinions 309 thus produced, can, since gears 273 are free to rotate, drive gears 288 to rotate spiders 274 and their attached numeral wheels 279 backwardly, toward the position in which their zero digits align with the sight openings 318. If a stopping means be placed in the path of lugs 278 carried on said numeral wheels to prevent them from being driven beyond zero position, the braking pawls 319 may be restored to operative position and the lock withdrawn from ring gears 301, leaving the numeral wheels 279 aligned in zero position.

This mode of operation is used to reset the accumulator to zero, by means of the following mechanism. Keyed upon shaft 320 (Figure 10), supported in plates 266, are rocking levers 350. The shaft 320 is rocked in a clockwise direction in the resetting operation, and movement of rocking levers 350 is transmitted to pawls 319, each pawl having a lateral projection 351 thereon which may be engaged by the associated lever 350 to free gears 271.

Lever 350 also acts to lock the ring gears 301 and place zero stops for the numeral wheels, and for this purpose is provided with an extension 352 engaging slot within lever 353 mounted on shaft 272, so that, upon clockwise rocking of lever 350, lever 353 is pushed in a counter-clockwise direction and lateral projection 354 on lever 353 is placed in a dial stop position. The lateral projection 354 is of sufficient width to engage the zero stop projection 278 on the dial assembly as well as to engage one of the four projections 302 on the spider 300 and gear 301 and limit the latter against movement past zero position during clearing of the accumulator, thus providing the aforementioned stopping means. Rebound of the dials is prevented by resilient member 355, on each lever 353 which engages the other side of projection 278 in each assembly from that engaged by projection 354, and retains each dial shell against rebound.

The dials are returned to zero position by mechanism comprising lateral projections 356 on each lever 313, which are engaged by extensions 357 on pawls 319 to rock levers 313 counterclockwise on shaft 272 against the pull of spring 317. Teeth 312 on levers 313 act to rock arms 304 and rotate planetary pinions 308 and 309 by feeding the former over the teeth of locked ring gears 301. Since gears 271 are free to rotate, rotation of planetary pinions 308 and 309 drives gears 288 to rotate spiders 274, and their attached numeral wheels 279, backwardly to the position in which the zero digits align with sight openings 318.

The shaft 320 is then rocked in a counterclockwise direction to remove projections 355 and 354 from cooperative relationship with lugs 278. This also permits pawls 319 to reseat between the teeth of gears 271 and permits the segments 313 to return under tension of springs 317 until the engagement of roller 316 with the periphery of snail cam 281 blocks further movement of the segment 313 by engagement of lug 314 thereon with the roller carrying lever 315.

Multiplication operation control

Depression of any one of the #1 to #9 multiplier keys 52 is adapted to effect engagement of a one-revolution clutch to connect the driving motor to the operating mechanism for a single cycle of operation, and, during such operation, to enter the calculated product into the accumulating mechanism.

As shown in Figure 12, the multiplier key section includes a parallel bar 371 adapted to be engaged by the stems of the above mentioned keys, and mounted for parallel movement upon link 372 and bellcrank 373, the bellcrank being urged in clockwise direction by spring 374 tensioned between one arm thereof and a stud on the frame of the machine. A link 376 is extended between an ear of the bar 371 and a lever 377 included in a lever system comprising said lever 377, to which link 376 is connected by pin and slot connection 375, lever 378, and lever 379, all three of which are pivotally mounted upon a common pin 381 fixed in an ear of the key frame. Levers 377 and 378 are provided with projections between which a spring 382 is compressed to urge the levers apart, and lever 378 is further provided with another projection cooperating with a complemental projection on lever 379 to retain a compression spring 383 functioning similarly. Lever 378 is also provided with projections 386 and 387 adapted to limit movement of the levers 377 and 379 respectively under the influence of their springs 382 and 383 just described, and is also provided with a pin 388 which lies beneath bar 371 and which is forced downwardly when said bar is depressed by depression of any of the multiplier keys 52.

It is desired to cause engagement of the clutch upon complete depression of any of these keys and to prevent the initiation of such operation before depression of such a key has been completed. The final tripoff, therefore, is placed under control of the key latching mechanism and the bar 371 jointly, as will now be described.

The clutch 401 of the machine is a cyclic, one-revolution clutch of any desired construction; for example, such as disclosed in the patent to Friden, Number 1,643,710, issued September 27, 1927. Such a clutch is normally restrained from driving engagement by means of a control dog 402 mounted for oscillation about shaft 403 and provided with a nose adapted to enter an aperture in the clutch housing to lock the driven mechanism in full cycle position. Clutch dog 402 is provided with a lug 404 adjacent its opposite end which is adapted to be engaged by a notched link 405 to rock the nose of the clutch dog out of engagement with the clutch housing. Link 405 is pivotally mounted upon one arm of a bellcrank 406 pivoted upon frame stud 407, and a spring 408 tensioned between the upper end of the link 405 and an ear on link 411, tends to maintain the notch of link 405 in engagement with the lug 404 so that upon counter-clockwise movement of the bellcrank 406, the clutch dog 402 will be moved counter-clockwise to effect driving engagement of the clutch 401. Link 411 connects the opposite arm of bellcrank 406 with an arm 412 fixed to shaft 413 so that rocking movement of said shaft 413 in a clockwise direction will, through the linkages just described, effect driving engagement of the clutch 401.

There is also connected to shaft 413 a lever 414 having an ear 415 underlying the link 376 so that a sufficient lowering of said link 376 will rock lever 414, shaft 413, and operate the above described linkages to rock clutch dog 402 and release the clutch for operation. Opposite ends of link 376 may be lowered by different means, as will appear, but the leverages are so arranged that the lowering of either end alone will not rock shaft 413 enough to cause operation of the clutch. As soon as both ends have been completely lowered, however, the additional rocking of shaft 413 will be sufficient to cause operation of the clutch 401.

As a multiplier key of any value from one to nine is depressed, the underlying parallel bar 371 is depressed, lowering the right end of link 376. The lever 378 having pin 388 underlying bar 371, is also rocked by this movement, rocking lever 377 through spring 382 only sufficiently to cause its lug 420 to move the key latching bar 421 to the left until it abuts the lug 422 of the moving key which arrests further movement of lever 377 and causes spring 382 to be compressed. As the lug 422 is moved below the latching bar 421, spring 382 is permitted to expand, rocking lever 377 to simultaneously bring the latch bar 421 over the lug 422 and lower the left end of link 376, both ends of which being now lowered, shaft 413 will have been rocked sufficiently to cause engagement of the clutch 401.

The latch bar 421 holds the depressed key down and all the other keys up until it is retracted. Means are provided for positively retracting the latch bar so that proper operation will be insured even though the operator is bearing down on any key and for holding it in retracted position in case the first operated key is thus held depressed until the operator has released the depressed key. No key can be left in latched down position, therefore, after the machine has come to rest.

For this purpose there is provided a lever 426 pivotally mounted on the key frame at 427. As the clutch 401 revolves during operation of the machine, cam 428 thereon, toward the end of the cycle, rocks lever 429, pinned to shaft 403, to bring its opposite end 431 against the lower curved end of said lever 426, rocking the latter in a clockwise direction and carrying its upper ear 432 against an abutment on the latch bar 421 so that said latch bar is positively moved to the right to release the previously depressed key and permit the depression of any other key.

If the operator is continuing to bear down upon the depressed key at the time the latch bar 421 is thus positively moved to the right, the bar will be latched in its rightmost position until pressure on the key is released. This is the function of the lever 379.

The slight initial leftward movement of latch bar 421, as depression of a key is begun, is sufficient to carry the notch 433 therein out of alignment with the end 434 of lever 379 so that the lug rides along the smooth under surface of the latch bar 421 during the further leftward movement thereof and spring 383 is compressed by depression of the key. However, if the key is being held down at the time the latch bar 421 is positively returned to the right, as hereinbefore described, spring 483 will expand to move the end 434 of lever 379 into the notch 433 and thus hold the latch bar in its rightmost position until the key is released. Upon release of the depressed key by the operator, however, lug 387 of lever 378 will carry the end 434 of lever 379 clear of the notch 433 of latch bar 421 to permit further operation of the mechanism upon depression of another key. Under such conditions the latch bar returning mechanism comprising lever 426, overcomes spring 382 and rocks lever 377 to raise the left end of link 376 so that the clutch can not be engaged a second time by the key held down.

To prevent a second cycle of operation of clutch 401, an arm 441 pinned to shaft 403 is provided for disconnecting the clutch dog 402 from its control link 405 just prior to the termination of the first cycle. Shaft 403 is rocked at the proper time by cam 428, as hereinbefore described, and arm 441 is provided with an ear 442 adapted to contact the link 405 upon such operation rocking it about its pivotal connection with bellcrank 406 to remove the notched lower end of said link from engagement with the lug 404 of clutch dog 402. Spring 442a tensioned between one arm of the clutch dog 402 and a frame stud may thereupon carry the nose of said dog into engagement with the periphery of the clutch housing, and as the clutch arrives at full cycle position, into the clutch housing aperture, locking it in full cycle position. Upon restoration of link 405 to its normal position, it will be reengaged with lug 404 by spring 408.

Multiplier circuit controls

The operation of the several mechanisms of the machine in their proper timed relation to each other, as described in detail hereinafter, is effected under the control of the general operator shaft 450 adapted to be cyclically operated by the motor drive through the one-revolution clutch 401, and by the calculation control shaft 451 adapted to be driven by the shaft 450 through reversing gearing for the purpose of effecting additive or subtractive operation selectively, as will be hereinafter described. For these purposes, each of these shafts is provided with a plurality of control cams, as shown in Figure 17.

The main control switch 114 (Figures 14 and 31C) of the calculation control circuit, which switch is normally open when the machine is at rest, is controlled by a cam on the shaft 450 so that it will be closed shortly after the cycle of operation commences, and reopened shortly before the cycle concludes. As shown in Figure 14, cam 455 mounted on shaft 450 is adapted to rock a cam follower 456 journaled on shaft 403 to carry a fibre stud 457 mounted on said cam follower against one of the flexible leaves of switch 114 fixedly mounted in the machine, thus bringing the contact points of the switch together and holding the main calculating circuit closed as long as the high part of the cam 455 is beneath the roller end of cam follower 456. In Figure 14 the parts are shown in full cycle position with the switch 114 open, and from this figure it will be apparent that shortly after the cycle commences the switch 114 will be closed and maintained closed until near the conclusion of the cycle of operation, when, as the low part of cam 455 comes under the end of cam follower 456, it will be permitted to reopen.

Operation of the multiplier key control gang switches referred to in connection with the description of Figure 31C, is also controlled by cams mounted on said shaft 450, the timing of the operation preferably being such that the gang switches are closed before the main switch 114 is closed, and the main switch 114 is reopened before the gang switch is reopened. By thus timing the operation it is possible to make the gang switches of very light construction because there will be no possibility of arcing therein if they are both closed and opened while their respective circuits are dead. All arcing will thus be localized at the switch 114 which may be made of comparatively heavy construction.

Complemental cams 460 fixed on shaft 450 are adapted to impart positive rocking movement in both directions to a cam follower 461 free on shaft 403 for the purpose of controlling the gang switch operations above referred to. Adjacent the keys of the multiplier bank a parallel bar 462 is pivotally mounted upon bellcranks 463 journaled in the multiplier key section frame of the machine, and also connected together by link 464. A link 466 connects an extension of one of the bellcranks 463 with the cam follower 461 so that as the shaft 450 begins its rotation, the parallel bar 462 will be raised, in a substantially vertical direction, to bring its appurtenant control mechanisms into cooperative relationship with the depressed multiplier key, as will now be described.

As shown in Figures 13 and 14, each multiplier key 52 is provided with a lateral extension 468 adapted to cooperate with one of a series of levers 469 pivoted on the parallel bar 462 as said bar is raised in the operation just described. Each said lever 469 is connected by a link 471 with an arm 472 of insulating material fixed to one of the rock shafts 473 (see also Figure 31C) rocking movement of which will effect closure of one of the multiplier gang switches, as will be hereinafter described. Rocking movement of each shaft 473 is, however, normally resisted by springs 474 tensioned between the ends of arms 472 and the frame of the machine. As the parallel bar 462 is raised, therefore, the springs 474 will prevent rocking movement of any of the shafts 473 so long as the associated lever 469 does not encounter the lug 468 of the multiplier key which has been depressed. In such operation the levers 469 associated with undepressed multiplier keys, will merely be rocked in a counter-clockwise direction, leaving their associated shafts 473 undisturbed. However, when one of the levers 469, in the course of such rocking movement, encounters the lug 468 of a depressed multiplier key, its counter-clockwise movement is arrested and as the parallel bar 462 continues to rise the opposite end of the lever 469 is caused to move in a clockwise direction overcoming the spring 474 and rocking the associated shaft 473 to effect closure of the selected multiplier gang switch.

As parallel bar 462 is returned to its normal position at the conclusion of an operation, one of the ears 476 of said bar will contact the end of the lever 469 which has effected rocking of a shaft 473, and will positively rock the said lever and shaft back to normal position.

Each multiplier gang switch comprises a series of contact units, one for each order of the multiplicand keyboard. Each such contact unit comprises a bank of nine spring contact leaves 480 (Figures 2, 3 and 31C) which normally lie interleaved between discs 481 of insulating material fixed upon each shaft 473. Each of said discs 481 has imbedded therein a chamfered metallic stud 482 positioned so that rocking movement imparted to the shaft 473, as hereinbefore described, will bring said stud into contact with the adjacent part of spring leaf contact 480. To insure the completion, in this manner, of electrical contacts between all of the spring leaves 480 of a given multiplier gang switch, there is provided adjacent each end of each bank of discs 481, a compressing cam 483 adapted to press the outside spring leaf 480 against its adjacent metallic stud 482 and to complete an electrical contact between the spring leaves 480 and the shaft 473.

Each shaft 473 is electrically connected by a flexible wire lead 484 to the main current supply line 113, through switch 114, and the several shafts 473 are each mounted in insulated bearings to prevent grounding to the frame of the machine. These insulated bearings each comprise a metallic bushing 486 retained in a plate 487 of insulating material, which, in turn, is fixed to the machine frame, as by bolts 488, so as to hold the bushing 486 centrally of a larger aperture 489 in said machine frame and out of electrical contact with said frame.

*Add bar control*

As shown in Figures 14, 18, and 19, mechanism is provided whereby the add and subtract bars 61 and 62 will effect exactly the same control of the calculation circuit as depression of the #1 multiplier key 52, will initiate operation of the machine in the same manner, and will effect automatic release of the depressed multiplicand keys. As an additional function, the subtraction key 62 also causes negative rather than positive operation of the calculating mechanism, as will hereinafter be described.

The add bar 61 is mounted for parallel movement upon a linkage comprising bellcranks 490 and connecting link 491, and is provided with a lug 492 overlying a stud 493 in lever 494 pivoted at 495 in the machine frame and linked by a pin and slot connection to a second lever 496 pivoted at 497 in the machine frame so that depression of the stud 493 will cause downward movement of the lug 498 of lever 496.

As shown in Figure 14, this lug 498 overlies a lever 469' pivoted on the parallel bar 462 and connected by a link 471' with the same shaft 473 controlled by the #1 multiplier key 52. It is thus apparent that the lowering of the lug 498 will have the same effect upon the calculation control circuits as the lowering of the lug 468 of the #1 multiplier key.

Minus bar 62 is also provided with a lug 499 overlying the stud 493 so that exactly the same control of the multiplier control circuits is effected by depression of this key as is effected by depression of the add bar 61 or the #1 multiplier key.

Pivotally mounted on the lever 494 at 493 is a vertical link 500 having an ear 501 which is retained in a position overlying bellcrank 502 by means of the link 503 pivoted to the lower end of lever 500 and journaled on a stud in the machine frame. Bellcrank 502 is fixed to shaft 413 which, it will be seen by reference to Figure 12, is the control shaft rocking movement of which in a clockwise direction is used to effect driving engagement of the main clutch 401. Hence depression of either the plus or minus key 61 or 62 will by depressing stud 493 lower link 500 and rock bellcrank 502 in a clockwise direction, rocking shaft 413 and causing engagement of the main clutch 401 to initiate operation of the machine. Spring 504 tensioned between the lower arm of bellcrank 502 and the stud on the machine frame, and spring 506 tensioned between one end of link 654 and a frame stud, normally maintains the linkages just described in their normal or inoperative position, while spring 507 tensioned between one of the bellcranks 490 and a frame lug maintains bar 61 in raised position, and spring 508 tensioned between the lower end of the stem of key 62 and shaft 578 maintains the key 62 in raised position.

*Automatic keyboard release*

The automatic release of the keys of the multiplicand keyboard upon operation of either the add or subtract bar 61 or 62, is effected by the means disclosed in Figures 2, 16, and 19.

Pivotally mounted at 651 and (Figures 2 and 16) lying adjacent the front ends of all of the key latching slides 156 of the multiplicand keyboard, is a releasing bail 652, the lower end of which is provided with a pin 653 embraced by and supporting one end of a bifurcated operating lever 654, the opposite end of which is supported by the spring 506 tensioned between said member and a frame stud. The spring-supported end of the member 654 is likewise slotted to receive a pin 656 which is an extension of the pivotal connection between link 503 and link 500 shown in Figure 19, and which, as will be recalled upon reference to said figure, is lowered upon depression of either the plus bar 61 or the minus bar 62.

The operating lever 654 is adapted to be temporarily held down after its depression by bar 61 or 62 by a spring pressed latch 655, and is provided on its lower edge with a lug 657 which, in the normal position of the parts, as shown in Figure 16, lies out of the path of movement of the upper end of lever 643 attached to shaft 611. However, upon depression of either the plus bar 61 or the minus bar 62, member 654 is lowered sufficiently to carry its lug 658 past the end of latch 655 and its lug 657 into the path of movement of the hooked upper end of lever 643; whereupon, upon oscillation of the shaft 611, the operating member 654 will be moved to the left (as viewed in Figure 16), carrying it free of latch 655, and will rock the key-releasing bail 652 in a clockwise direction, releasing all depressed keys in the multiplicand keyboard.

The hooked end of lever 643 is so located with respect to lug 657 as to permit the right end of member 654 to rise sufficiently to prevent reengagement of latch 655 over lug 658 upon the return movement of the parts. This hook, however, prevents disengagement of lug 657 and lever 643 until the keys have been released and the parts returned.

Rocking of the shaft 611 is effected by means of link 642 connecting the lower end of lever 643 with an arm 641 pinned to shaft 403. This shaft, it will be recalled by reference to Figure 12, is rocked by cam 428 and its follower 429, toward the close of each cycle of operation.

The multiplicand keyboard keys may also be manually released by means of the keyboard clear key 661 (Figure 16) normally maintained in raised position by means of its spring 662 tensioned between a lug on the lower end of the key and the frame. A second lug 663 on the stem of key 661 overlies an extension of the key release bail 652, so that upon depression of the key 661 the releasing bail 652 will receive the same clockwise movement imparted to it by the automatic key releasing mechanism, releasing any depressed keys of the multiplicand keyboard.

*Accumulator operation controls*

In the previous description, the differential advance of intermediate gears 203 mounted in the machine frame under control of the selecting mechanism, has been referred to, and the accumulating mechanism adapted to be driven by means of intermediate gears 271 mounted in the carriage, has been fully described. Gears 271 and 203 are normally maintained out of mesh with each other in order to permit lateral shifting movement of the carriage in accordance with the usual procedure in performing problems in multiplication with machines of this general type, and also to permit the accumulating mechanism to be reset to zero. In order to effect entry of the selected amounts into the accumulating mechanism, however, it is necessary to bring the gears 271 into mesh with the gears 203 during the time the latter are being driven by the actuating mechanism.

It will be recalled from the previous description that the amplitude of movement of segments 197 with drive gear 203 is controlled by the electrically controlled selection mechanism; the mechanism for effecting movement of said segments 197 within the range so determined, however, is shown in Figures 5, 6, and 17.

When the machine is at rest, the segments 197 are normally held locked in their home position by means of a bail 517 (Figures 2 and 6) carried on levers 515 pivoted at 516 in the machine frame, and adapted to engage between two teeth of the segment 197 to restrain the same against movement. Raising of the levers 515 to effect unlocking of the segment is effected by means of two sets of complemental cams 521 adapted to effect positive movement of cam followers 522 pivoted on shaft 198 and connected by links 524 with the levers 515 supporting each end of the locking bail 517. The contour of the complemental cams 521 is such that the unlocking is effected just subsequent to the closure of the calculation circuit, the control of which is hereinbefore described, a relocking and second unlocking taking place at mid-cycle for a purpose hereinafter described.

Immediately after the segments are unlocked rollers 530 (Figure 5) carried by arms 531, also fixed on shaft 451, permit cam levers 532 to move. These levers 532 are pivoted at 533 in the machine frame and connected by pin and slot connections with levers 534 supporting each end of a bail 535 normally lying in contact with the segments 197 when the latter are in their home position, and their release therefore permits the segments 197 to advance differentially under the influence of their several springs 202, differentially advancing the gear 203 in a clockwise direction. Thereafter, as the cycle progresses, rollers 530 again come into contact with cam levers 532 rocking levers 534 and moving bail 535 in the opposite direction to positively return segments 197 to their home position, rotating gear 203 by the same differential amount in the opposite direction.

From the foregoing, it will be apparent that if the carriage gears 271 are meshed with the intermediate gears 203 during movement of the segments in one direction, an addition operation will result, while if the gears 271 are meshed with the intermediate gears 203 while the segments are being moved in the opposite direction, a subtraction operation will result. Means are provided under the control of appropriate addition and subtraction control mechanisms for selectively meshing the gears 271 with the gears 203 while the segments are being moved in either direction for the purpose of effecting addition or subtraction, selectively, the midcycle locking and unlocking of the segments, hereinbefore referred to, serving to hold the segments stationary during the meshing or demeshing which takes place at that time.

As shown in Figure 4, the carriage dipping bail 269, previously described in connection with the description of the accumulator mechanism, is embraced between a pair of rollers 541 carried on the carriage dipping links 542, one of which is provided adjacent each side of the machine. The dipping link 542 is mounted for vertical movement, being provided with a slot embracing a pin 543 on the machine frame, and vertical movement thereof is effected by means of cam 546 fixed on shaft 451 which cam is adapted to rock cam follower 547 provided with two rollers for cooperating with the surface of the cam so as to effect positive movement of the follower. The lower end of the dipping link 542 is connected to one such follower, duplicate cams and followers being provided, as shown in Figure 17.

The cams 546 are so proportioned, as shown in Figure 4, that upon clockwise movement of the shaft 451, the followers 547 will be rocked and the carriage dipped to bring the gears 271 and 203 into mesh at the very outset of the cycle of operation, so that as the segments 197 move forward under the influence of their springs 202 rotating the gears 203 in a clockwise direction, the gears 271 will be meshed therewith and a registration will be effected during this first portion of the cycle. After the segments have so moved forward, and while they are locked by the midcycle operation of bail 517, the cam followers 547 will be again rocked back to their original positions, raising the gears 271 out of mesh with the gears 203 before the bail 535 returns the segments 197 to their home position, so that no registration will be transmitted to the carriage during such return of the segments.

The dials are so calibrated in the machine here disclosed as an example of the invention, as to make this a subtractive operation, although it is obvious that by placing the numerals in opposite order upon the dial shells, this direction of operation could just as well be made additive.

When the shaft 451 is rotated in a counter-clockwise direction, no movement of the followers 547 takes place during the first half of the cycle during which the segments 197 move forward in differential amounts determined by the positioning of the electrically controlled stops, and during which the intermediate gears 203 are being rotated in a clockwise direction. However, after such movement of the segments has been completed, and while they are locked by the midcycle operation of bail 517, further rotation of the cams 546 rocks followers 547 and causes the carriage to be dipped, bringing gears 271 into mesh with gears 203 and retaining them in engagement while the bail 535 returns the segments 197 to their home position, rotating the intermediate gears 203 in a counter-clockwise direction the same differential amount which they were rotated during the first advance of the segments.

By this means the same differential entries are made into the accumulator in the opposite direction and in the case of the present machine as explained above, this is an additive operation. It is thus apparent that the additive or subtractive character of the operation is determined by the direction of rotation of shaft 451.

As the carriage is dipped, by the means above described, the lower arms of pawls 319 (Figure 4) in orders overlying gears 203, are brought against shaft 550, mounted in the frame, rocking the noses of said pawls out of engagement with the carriage intermediate gears to free them for operation, in both additive and subtractive operations.

Although both the complemental lock operating cams 521 and the segment returning arms 531 are also mounted on shaft 451, both they and their cooperating parts are so proportioned and arranged that the direction of operation of the shaft makes no difference whatever in the times of operation of the locking bail 517 and the rack retaining bail 535, as will be apparent from inspection of Figures 5 and 6. The only effect of reversal of shaft 451 therefore is to alter the cyclic time of lowering and raising the dipping carriage, as above described, in order to select additive or subtractive operation, as may be desired.

*Subtractive operation controls*

For reversing the direction of drive of the shaft 451 with respect to the shaft 450, and thus determining the additive or subtractive character of the operation as hereinabove described, a selectively settable drive reversing unit is provided as shown in Figures 21 to 25, inclusive. As shown in Figure 17, this unit is mounted coaxially with shafts 450 and 451, transmitting power from the former to the latter by means of intermediate gearing shown in dotted lines in said figure.

Referring to Figure 23, the unit proper comprises a central sleeve 551 keyed to the general operator shaft 450 and having a clutch plate 552 integral therewith. Notched drive discs 553 and 554 are rotatably mounted on sleeve 551 on opposite sides of plate 552, disc 553 having a gear 555 fixed thereto, while disc 554 has a gear 556 fixed thereto.

Driving connection between the clutch plate 552 rotated by the main clutch and either gear 555 or 556 is secured selectively by effecting a driving connection between the plate and either of the discs 553 or 554. For this purpose, clutch plate 552 has pivoted thereto a lever 557 (as shown in Figures 21 and 22), said lever 557 being formed with offset ends, each of which is provided with an integral dog 558; one of said dogs being adapted to engage with a notch in the periphery of one of the discs 553-554. Thus, when one of the dogs 558 is in engagement with the notch in disc 553, the driving connection is established between plate 552 and disc 553, and thence to gear 555; while, when the other dog 558 of lever 557 is in engagement with the notch in the periphery of disc 554, a driving engagement is established between disc 552, disc 554, and thence to gear 556.

Gear 555 is directly keyed to the carriage dipping cam 546 which in turn is keyed to shaft 451, so that when the drive is transmitted directly from clutch plate 552 by way of disc 553 to gear 555, the shaft 451 rotates in the same direction as the general operator shaft 450.

Gear 556, however, drives through to gear 555 through intermediate gears A, B, and C indicated in Figure 17, so that when the drive is transmitted from clutch plate 552 by way of disc 554 to gear 556, and thence through gears A, B, and C to gear 555, the shaft 451 will be rotated in the opposite direction from the general operator shaft 450.

It is thus apparent that by selective rocking of the control lever 557 mounted on clutch plate 552, the direction of operation of shaft 451 with respect to shaft 450 may be selected and the additive or subtractive character of the operation of the machine thus controlled.

A spring pressed click-pawl 561 (Figure 21) pivotally mounted on the clutch plate 552 and spring pressed against one end of the lever 557, tends to maintain the said lever 557 with one or the other of its dogs in engagement with a notch in one of the plates 553–554, subject, of course, to alteration of such adjustment by means of the control mechanism hereinafter disclosed.

Selective engagement of the notches of discs 553 or 554 by the dog 558 of lever 557 is secured by reverse control unit shown in Figure 21, which comprises a lever 566 pivotally mounted on stud 567 and having offset arms adapted to engage respectively the offset ends of lever 557 to rock the lever and selectively engage either of its dogs 558 with the notch of its cooperating disc. An upwardly extending arm of lever 566 is provided with a pin 571 embraced by a bifurcated lever 572 pivoted at 573 in the machine frame and adapted to be rocked about said pivot by a link 574 connected to its upper end. The opposite end of link 574 is pivotally connected at 576 with a swinging lever 577 pinned to stub shaft 578 mounted in the machine frame, and spring 579 tensioned between lever 572 and the machine frame, normally maintains the reversing unit in, and returns it to additive adjustment, being sufficiently strong to overcome the spring of click-pawl 561.

As shown in Figures 18 and 21, the minus key 62 effects adjustment of the reversing unit just described by means of a lever 583 fixed to shaft 578 and having an end underlying a lug 580 on the stem of the minus bar 62; thus upon depression of the minus bar 62, lever 583 is rocked in a clockwise direction rocking shaft 578 and moving lever 577, which is also fixed to said shaft, in a clockwise direction to move link 574 to the left and rock levers 572 and 566 to adjust the dog-carrying lever 557 of the reverse unit to subtractive position.

As the machine commences operation the reversing unit will be maintained in its adjustment even though the minus bar 62 be released, by the means shown in Figures 20 and 21 comprising a lever 586 fixed on shaft 413 which, it will be recalled by reference to Figure 12, is the general control shaft for the main clutch. Said lever 586 is provided with a notched end adapted to engage over a lug 587 formed on the lower end of lever 577 connected to the reverse unit control link 574 so that when the lever 577 has been once shifted and the machine started by rocking shaft 413, no further displacement of the reverse unit control linkages is possible until the notched end of link 405 (Figure 12) is released from the dog 402 near the end of the cycle.

Until that time, the nose of the dog 402 riding upon the periphery of the clutch housing 401 prevents shaft 413 from rocking counter-clockwise far enough to remove the end of lever 586 from ear 587. After that time, the reverse unit can not shift until the notch of one of its plates 553 or 554 aligns with one of the dogs 558 at full cycle position. Likewise if the machine be started with the reverse control unit adjusted to additive position, the end of lever 586 will engage against the side of lug 587 to prevent its adjustment to subtractive position, even though a subtractive control key be operated in the interim.

In addition to its function in setting the main reverse unit upon depression of the minus bar 62 the lever 583 (Figure 18) also acts as an interlock to prevent simultaneous depression of the plus bar 61 and minus bar 62 and for this purpose is provided with a lug adapted to underlie the stem of bar 61 when the minus bar 62 has been depressed, thus preventing depression of plus bar 61. In the same way, depression of the plus bar will bring its stem into blocking relation with said lug so that the opposite end 584 will be locked up under the lug 580 of the stem of the minus bar 62 to prevent its depression at the same time that the plus bar 61 is depressed.

The reverse unit may also be set to negative adjustment by means of a negative multiplication key 56, through the agency of the mechanism shown in Figures 26 and 27. Since a very large percentage of all multiplication operations are positive rather than negative, a negative multiplication key 56 is designed to control the operation of the machine only for the determination of the product of a single multiplier digit, the machine being automatically restored to positive calculation adjustment after such determination, unless the negative multiplication key be again depressed, or held down by the operator continuously throughout a multiple order operation.

As shown in Figures 26 and 27, the stem 601 of the negative multiplication key 56 is provided with a lug 602 which, upon depression of the key engages one end of the lever 603 pivoted on supporting plate 604, carrying the opposite end of lever 603 up beneath a lug 606 formed on an arm of lever 577, rocking said lever in a clockwise direction (see also Figure 21) to adjust the reverse unit to negative position. As the stem 601 of the key descends, a latch 608, free on shaft 611, engages over a shelf 612 formed on the lower end of the key stem 601 to hold the latter in depressed position and retain the reverse unit in negative adjustment against the action of spring 579 until an operating key is depressed.

In the event that it is desired to release the negative multiplication key 56 from the lock 608 before the machine is operated, the release key 614 may be depressed. This key is mounted for vertical movement, and is provided at its lower end with an ear 616 adapted to contact one end of and rock a lever 617 pivoted on stud 618 and provided with an ear 619 whereby when it is rocked by depression of the key 614 it will rock latch 608 to remove it from contact with the shelf 612 of the key stem 601, permitting the latter to rise under the influence of its spring 621, and permitting spring 579 to reset the reverse unit to additive adjustment.

At the beginning of a cycle of operation and after the latch 586 of Figure 20 is engaged to hold the reversing unit in negative position, the negative multiplication key 56 is automatically released from the latch 608 by counter-clockwise rocking movement of shaft 611 (Figure 26) which has fixed to it a short, bifurcated arm 626 engaging a pin on one end of a lever 627 pivoted on the supporting plate 604 and having its opposite end overlying a shelf 628 formed on the latch member 608. Counter-clockwise rocking movement of the shaft 611 thus rocks the latch 608 clockwise carrying it out of engagement with the shelf 612 formed on the lower end of key stem 601 and releasing the key to permit the reversing unit to return to positive adjustment, after operating lock 586 is released and full cycle position is reached.

To prevent reengagement of the latch 608 with the lug 612 of the negative multiplication key 56 in case the operator is holding the negative multiplication key down at the time the rocking of shaft 611 occurs, a latch 631 is provided pivoted on the supporting plate 604 at 632 and urged by spring 633 toward engagement with a lug 634 on the upper end of latch 608. When the key stem 601 is in its raised position, the shelf 612 on the lower end thereof engages under the latch 631 holding it up to prevent it from engaging with latch 608. As the key stem 601 descends, however, and is latched down, latch 631 is pressed down against the top of lug 634 on latch 608 and remains there until the rocking movement of the shaft 611 takes place. At such time, if the negative multiplication key 56 is being held down, the rocking movement of the shaft 611 will carry lug 634 of latch 608 into engagement with the notched end of latch lever 631, where it will be retained until the key 56 is permitted to rise, at which time shelf 612 will engage the lower side of the latch 631 releasing it from lug 634 and permitting the spring attached to latch 608 to return it against the side of shelf 612 in position to latch the negative multiplication key down upon another depression thereof.

The means for effecting such counter-clockwise rocking movement of shaft 611 is shown in Figures 12 and 16. Referring to Figure 12, it will be recalled that the cam 428 rocks cam follower 429 pinned to shaft 403 so that the said shaft is rocked near the end of the cycle of operation of the clutch 401. Referring to Figure 16, the shaft 611 as shown therein, has pinned to it a lever 643 connected by link 642 with an arm 641 pinned to the clutch dog supporting shaft 403 so that upon rocking of the cam follower 429, the shaft 611 will be given a counter-clockwise movement sufficient to operate the negative multiplier key release mechanism hereinbefore described, as well as the automatic multiplicand key release mechanism hereinbefore described.

*Multiplier register*

The multiplier register mechanism proper includes a plurality of dials which may be viewed through sight openings 701 (Figure 1) in the accumulator carriage. The construction of these dials is similar to that of the accumulator mechanism dials to which reference may be had for a detailed description of the construction thereof. In the present case, the dials are mounted upon a shaft 702 (Figure 7) extending through the brace plates of the several orders and the actuating gear of each multiplier register unit is adapted for drive by the mechanism hereinafter described through intermediate gears 703 and 704 indicated diagrammatically in Figure 29.

Immediately prior to each operation of the machine, either additively or subtractively, the roller carriers 706 (Figure 7) of each order are freed from spring tension to permit their rollers to move out of contact with and out of the path of snail cam 707. This occurs upon each dip of the dipping carriage only in the operated order and all orders to the left thereof in this registering mechanism, as distinguished from the simultaneous operation of all orders in the main accumulating register, and is for the purpose of obviating a strain on the mechanism which would result if the rollers had to be backed up the steep rise of the cam in reversible operation of the mechanism.

As shown in Figure 8, the levers 708 are rocked against the tension of their springs 709 upon each carriage dipping operation by bellcranks 711, one end of each of which underlies an arm of a lever 708 and the other end of each of which underlies a bail 712 supported on bellcranks 713 pivoted in the machine frame and having their opposite ends underlying the main carriage dipping bail 269. Roller carrier levers 706 being held against the snail cams 707, only by the tension of spring 709 which presses ears 314 against them, are thus freed from this tension and do not interfere with operation in either direction.

Selection of the proper digit for registration upon the multiplier register, is controlled electrically by contacts 716 (Figures 3 and 31C) operated by rocking movement of the shafts 473 (see also Figure 14) controlled by the particular multiplier key depressed which, as shown in Figure 15, control a single bank of solenoids and a single selection stop bar 731 corresponding to the selection stop bars 191 of the multiplicand orders. The single stop bar 731 through three-armed lever 732, controls the excursion of a segment 733 corresponding in construction and arrangement to the segments 197 of the multiplicand orders, and controlled in its excursion also by the same bail 535 which controls the corresponding segments of the multiplicand orders. The same locking bail 517 also serves to hold the segment 733 against operative movement except at the proper time.

As shown in Figures 15 and 29 and 30, segment 733 engages and operates the initial gear 734 of a train comprising gears 736, 737, 738 and 739; gears 736 to 739 being journaled in plates 741 pivotally mounted upon the axis 742 of gear 736 so that gears 737 to 739 may be shifted by pivotal movement of the plates to bring gear 739 into and out of mesh with gear 704 for the purpose of transmitting the differential movement of segment 733 to the multiplier registering mechanism mounted in the carriage.

Plates 741 are connected by link 742 with one of the cam followers 547 which, it will be recalled upon reference to Figure 4, is one of the pair which controls the raising and lowering of the accumulator's dipping carriage. It will also be recalled that the follower 547 is controlled by reversibly operable cam 546 so that by effecting engagement of the gearing during the travel of the rack in either direction, a selection between additive and subtractive operation can be made. Since the multiplier registering mechanism is controlled in the same way, it is apparent at once that the direction of entry of the multiplier digit into the multiplier registering mechanism will also depend upon the direction of operation of the shaft 451.

However, it is sometimes desirable to reverse the direction of operation of the multiplier register with respect to the main accumulator so as, for instance, to register a positive value in the multiplier register while the product is being subtracted from an amount standing upon the main accumulator. For this purpose, reversing gearing is interposed in the train of driving mechanism between the multiplier segment 733 and the train of gears 737 to 739 inclusive, whereby the foregoing result may be accomplished.

As shown in Figure 30, gear 736 is fixed to a shaft 746; gear 734 being formed integrally with a sleeve 747 rotatably mounted on said shaft 746. Adjacent its opposite end shaft 746 is slotted to receive a slidable key 748 adapted to be slid endwise with respect to the shaft to key it selectively either to sleeve 747 which is notched adjacent its end to receive the key 748, or to a gear 749 having a similarly notched hub adapted to receive the key.

When the key is in the position shown in Figure 30, shaft 746 and sleeve 747 are connected together and rotate as a unit; but when the key 748 is shifted so as to key the shaft 746 to the gear 749, the drive will be transmitted through sleeve 747, gear 751 mounted thereon and integral therewith, and through idler gears 752, 753, and 754, to gear 749, and thence to shaft 746, whereby said shaft will be rotated in the opposite direction with respect to sleeve 747 and an opposite registration upon the counter will ensue.

Such shifting of the key 748 is effected by means of the laterally shiftable shaft 756 provided with a head 757 rotatably retained in a recess in the key 748 so as to permit rotation of the key with respect to the shaft 756. Adjacent its opposite end, shaft 756 is provided with a notch in which a cam member 758 is received, and this cam member is provided with laterally offset portion connected by a cam slope whereby the shaft 756 may be shifted laterally upon oscillatory movement of the said member 758.

The reverse shifting cam 758 is pivoted at 759 and connected by links 761 and 762 with the reversing lever 58 pivoted at 769 in the machine frame, and projecting above the keyboard plate thereof. Spring plate 771 pivoted at 772 in the machine frame and actuated by spring 773 tensioned between the plate and a stud on the machine frame, bears against the pointed lower end of lever 58 and tends to maintain it in either of its two end adjusted positions preventing inadvertent shifting of the multiplier register reversing mechanism.

While a specific embodiment of the invention is described herein, it will be understood that many modifications thereof are possible, and it is intended, therefore, that the scope of the present invention be limited only as required by the prior art and the spirit of the appended claims.

I claim:

1. In an electrical calculating machine having a register, and differential actuating mechanism therefor arranged in a series of denominational orders; the combination of ordinal selecting mechanism comprising a plurality of electromagnetic devices in each order thereof associated with the respective orders of said actuating mechanism for controlling the actuation of said register thereby, multiplier setting mechanism, multiplicand setting mechanism arranged in a series of denominational orders, and means for simultaneously energizing a plurality of selected devices in each two adjacent denominational orders of said selecting mechanism in accordance with the tens component and the units component, respectively, of a product, comprising a series of groups of tabular connections for energizing said devices, each of said groups being jointly controlled by said multiplier setting mechanism and by a single order of said multiplicand setting mechanism.

2. In an electrical calculating machine having a register, and differential actuating mechanism therefor arranged in a series of denominational orders; the combination of ordinal selecting mechanism associated with the respective denominational orders of said actuating mechanism for controlling the actuation of said register thereby, each order of said selecting mechanism comprising settable selecting elements and electromagnetic devices for setting the same; multiplier setting mechanism, multiplicand setting mechanism arranged in a series of denominational orders, and means for simultaneously energizing a plurality of selected devices in each two adjacent denominational orders of said selecting mechanism in accordance with the tens component and the units component, respectively, of a product, comprising a series of groups of tabular connections for energizing said devices, each of said groups being jointly controlled by said multiplier setting mechanism and by a single order of said multiplicand setting mechanism.

3. In an electrical calculating machine having a register, and differential actuating mechanism therefor arranged in a series of denominational orders, each of said orders comprising a plurality of differentially movable entry controlling members and means jointly controlled by said members for actuating said register; the combination of ordinal selecting mechanism associated with the respective denominational orders of said actuating mechanism and including electromagnetic devices associated with each of said entry controlling members to control differential movement thereof; multiplier setting mechanism, multiplicand setting mechanism arranged in a series of denominational orders, and means for simultaneously energizing a plurality of selected devices in each two adjacent denominational orders of said selecting mechanism in accordance with the tens component and the units component, respectively, of a product comprising a series of groups of tabular connections for energizing said devices, each of said groups being jointly controlled by said multiplier setting mechanism and by a single order of said multiplicand setting mechanism.

4. In an electrical calculating machine having a register, and differential actuating mechanism therefor arranged in a series of denominational orders, each of said orders comprising a plurality of individually differentially movable entry controlling members and means jointly controlled by said members for actuating said register; the combination of ordinal selecting mechanism associated with the respective denominational orders of said actuating mechanism and including settable selecting elements and electromagnetic devices for setting the same; multiplier setting mechanism, multiplicand setting mechanism arranged in a series of denominational orders, and means for setting said selecting elements to concurrently control differential movement of a plurality of the entry controlling members of a single denominational order of said actuating mechanism in accordance with the tens component and the units component, respectively, of a product, comprising a series of groups of tabular connections for energizing said devices, each of said groups being jointly controlled by said multiplier setting mechanism and by a single order of said multiplicand setting mechanism.

5. In an electrical calculating machine having a register, and differential actuating mechanism therefor arranged in a series of denominational orders; the combination of ordinal selecting mechanism comprising a plurality of electromagnetic devices in each order thereof associated with the respective orders of said actuating mechanism for controlling the actuation of said register thereby; each of said electromagnetic devices comprising a plurality of mutually insulated windings, multiplier setting mechanism, multiplicand setting mechanism arranged in a series of denominational orders, and means for simultaneously energizing a plurality of selected devices in each two adjacent denominational orders of said selecting mechanism in accordance with the tens component and the units component, respectively, of a product, comprising a series of groups of tabular connections for energizing said windings, each of said groups being jointly controlled by said multiplier setting mechanism and by a single order of said multiplicand setting mechanism.

6. In an electrical calculating machine having a register, and differential actuating mechanism therefor arranged in a series of denominational orders, each of said orders comprising a plurality of differentially movable entry controlling members and means jointly controlled by said members for actuating said register; the combination of ordinal selecting mechanism associated with the respective denominational orders of said actuating mechanism and including electromagnetic devices associated with each of said entry controlling members to control differential movement thereof; each of said electromagnetic devices comprising a plurality of mutually insulated windings; multiplier setting mechanism, multiplicand setting mechanism arranged in a series of denominational orders, and means for simultaneously energizing a plurality of selected devices in each two adjacent denominational orders of said selecting mechanism in accordance with the tens component and the units component, respectively, of a product, comprising a series of groups of tabular connections for energizing said windings, each of said groups being jointly controlled by said multiplier setting mechanism and by a single order of said multiplicand setting mechanism.

7. In an electrical calculating machine having a register, and differential actuating mechanism therefor arranged in a series of denominational orders, each of said orders comprising a plurality of differentially movable entry controlling members and means jointly controlled by said members for actuating said register; the combination of ordinal selecting mechanism associated with the respective denominational orders of said actuating mechanism and including settable selecting elements and electromagnetic devices for setting the same; multiplier setting mechanism, multiplicand setting mechanism arranged in a series of denominational orders, and means for setting said selecting elements to concurrently control differential movement of a plurality of the entry controlling members of a single denominational order of said actuating mechanism in accordance with the units component of a product of the value set up in the order of said selecting mechanism associated with said order of the actuating mechanism multiplied by a value set up in said multiplier setting mechanism and the tens component of a product of the value set up in the next lower order of said selecting mechanism multiplied by a value set up in said multiplier setting mechanism, comprising a series of groups of tabular connections for energizing said devices, each of said groups being jointly controlled by said multiplier setting mechanism and by a single order of said multiplicand setting mechanism.

HAROLD T. AVERY.